United States Patent
Ike et al.

(10) Patent No.: US 8,425,660 B2
(45) Date of Patent: Apr. 23, 2013

(54) METHOD FOR EXTRACTING WATER FROM AIR, AND DEVICE THEREFOR

(75) Inventors: Hidetoshi Ike, Nankoku (JP); Nao Okuhata, Nankoku (JP)

(73) Assignee: Kankyo Co., Ltd., Yokohama-Shi (JP)

( * ) Notice: Subject to any disclaimer, the term of this patent is extended or adjusted under 35 U.S.C. 154(b) by 0 days.

(21) Appl. No.: 12/909,509

(22) Filed: Oct. 21, 2010

(65) Prior Publication Data

US 2011/0088552 A1    Apr. 21, 2011

Related U.S. Application Data

(63) Continuation of application No. 11/597,376, filed as application No. PCT/JP2004/007529 on May 26, 2004, now abandoned.

(51) Int. Cl.
*B01D 53/02* (2006.01)
(52) U.S. Cl.
USPC ........ 95/114; 95/120; 95/125; 165/9; 165/59; 165/DIG. 20; 384/15
(58) Field of Classification Search .................... 95/114, 95/120; 96/125; 165/9, 49, 59, DIG. 20; 277/309; 384/15
See application file for complete search history.

(56) References Cited

U.S. PATENT DOCUMENTS

| | | |
|---|---|---|
| 2,078,295 A | 4/1937 | Thatcher |
| 2,104,851 A | 1/1938 | Crawford |
| 2,138,689 A | 11/1938 | Altenkirch |
| 2,138,690 A | 11/1938 | Altenkirch |
| 2,342,211 A | 2/1944 | Newton |
| 2,462,952 A | 3/1949 | Dunkak |
| 3,889,742 A | 6/1975 | Rush et al. |
| 4,081,024 A | 3/1978 | Rush et al. |
| 4,146,372 A | 3/1979 | Groth et al. |

(Continued)

FOREIGN PATENT DOCUMENTS

| GB | 2321603 A | 8/1998 |
|---|---|---|
| JP | 54-47354 A | 4/1979 |

(Continued)

OTHER PUBLICATIONS

"Tube," The American Heritage Dictionary of the English Language: Fourth Edition 2000.*

(Continued)

*Primary Examiner* — Jason M. Greene
*Assistant Examiner* — Anthony Shumate
(74) *Attorney, Agent, or Firm* — Birch, Stewart, Kolasch & Birch, LLP

(57) ABSTRACT

A method by which water may be extracted from the air even without a supply of electricity from a power source or even without a supply of fuel, as well as an apparatus therefor, is disclosed. The apparatus used for the method for extracting water from the air comprises at least a rotatably mounted hygroscopic moisture-absorbing rotor having at least one region through which air can pass in the direction of thickness thereof; a passage for regeneration through which air for regeneration is circulated, of which both ends are opened at the opposing two surfaces of a regeneration region, respectively, the regeneration region being a part of the moisture-absorbing rotor, at which the moisture-absorbing rotor that absorbed moisture is regenerated; and a drain hole for taking out condensed water from the passage for regeneration.

20 Claims, 19 Drawing Sheets

U.S. PATENT DOCUMENTS

| | | | |
|---|---|---|---|
| 4,180,126 | A | 12/1979 | Rush et al. |
| 4,180,985 | A | 1/1980 | Northrup, Jr. |
| 4,185,969 | A | 1/1980 | Bulang et al. |
| 4,285,702 | A | 8/1981 | Michel et al. |
| 4,344,778 | A | 8/1982 | Matsuoka et al. |
| 4,365,979 | A | 12/1982 | Takeyama et al. |
| 5,106,512 | A | 4/1992 | Reidy |
| 5,504,924 | A | 4/1996 | Ohashi et al. |
| 5,572,779 | A | 11/1996 | Adelman et al. |
| 5,655,594 | A | 8/1997 | Wonderling |
| 5,846,296 | A | 12/1998 | Krumsvik et al. |
| 6,029,467 | A | 2/2000 | Moratalla |
| 6,139,045 | A | 10/2000 | Vandenbark et al. |
| 6,235,086 | B1 | 5/2001 | Fujimura |
| 6,361,585 | B1 | 3/2002 | Anzai et al. |
| 6,527,837 | B2 | 3/2003 | Kurosawa et al. |
| 6,644,060 | B1 | 11/2003 | Dagan et al. |
| 7,467,523 | B2 | 12/2008 | Vetrovec et al. |
| 2004/0070934 | A1 | 4/2004 | Tomioka et al. |

FOREIGN PATENT DOCUMENTS

| | | |
|---|---|---|
| JP | 61-178015 A | 8/1986 |
| JP | 62-021566 B2 | 5/1987 |
| JP | 2001-254402 A | 9/2001 |
| WO | WO 96/09443 A1 | 3/1996 |
| WO | WO 01/63059 A1 | 8/2001 |

OTHER PUBLICATIONS

"Spontaneous," Webster's Third New International Dictionary, Unabridged, Copyright 1993.*

Supplementary European Search Report dated Aug. 8, 2011, for Application No. 04734916.2.

The American Heritage Dictionary of the English Language: Fourth Edition 2000, "tube" 1 page.

* cited by examiner

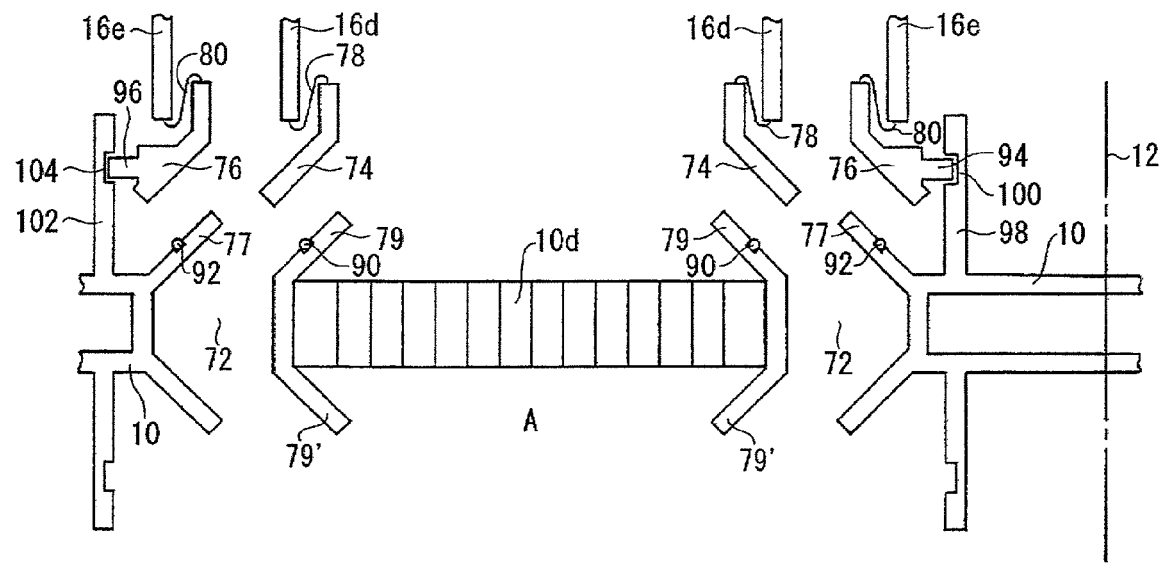
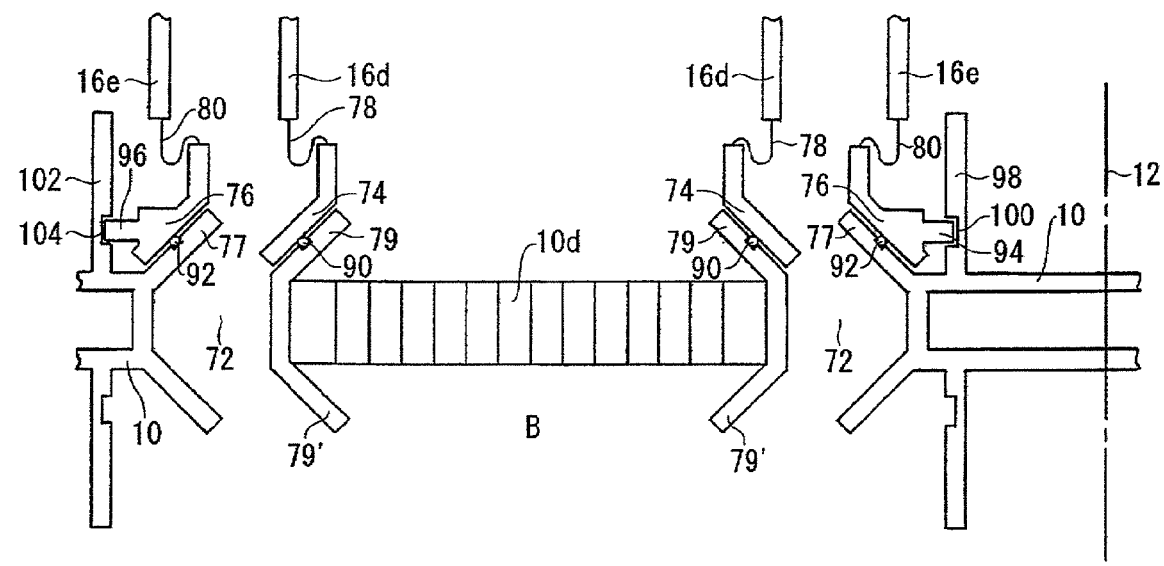
Fig. 14

US 8,425,660 B2

METHOD FOR EXTRACTING WATER FROM AIR, AND DEVICE THEREFOR

This application is a Continuation of application Ser. No. 11/597,376 filed on Nov. 22, 2006 now abandoned and for which priority is claimed under 35 U.S.C. §120. Application Ser. No. 11/597,376 is the national phase of PCT International Application No. PCT/JP2004/007529 filed on May 26, 2004 under 35 U.S.C. §371. The entire contents of each of the above-identified applications are hereby incorporated by reference.

TECHNICAL FIELD

The present invention relates to a method for extracting water from the air and to an apparatus therefor. More particularly, the present invention relates to a method for extracting water from the air by which water may be extracted from the air even without a supply of electricity from a power source or even without a supply of fuel, and to an apparatus therefor.

BACKGROUND OF THE INVENTION

As an apparatus for extracting water from the air, for example, the apparatus disclosed in Japanese Laid-open Patent Application (Kokai) No. 54-127870 is known. With this apparatus, moisture in the air is absorbed by an absorber containing a moisture absorbent. Thereafter, the absorber is heated by utilizing sunlight to desorb the moisture absorbed by the absorber, then the desorbed moisture is condensed and the resulting condensed water is taken out. With this apparatus, although the regeneration of the absorber is carried out utilizing solar heat, power is necessary for operating a ventilator which causes air flow in the apparatus, and for operating a flap which switches the passage through which air passes. Thus, the apparatus does not operate using solar heat alone.

With the apparatus for producing water disclosed in Japanese Patent Publication (Kokoku) No. 62-21566, air is made to pass through an absorbent packed in an absorption chamber divided into small chambers to thereby absorb the moisture in the air by the absorbent. The absorption chamber is intermittently rotated, and heated air is blown into a prescribed small chamber to thereby desorb the moisture absorbed by the absorbent. The desorbed moisture is condensed and the resulting condensed water is taken out. With this apparatus, power is necessary for operating a blower for flowing the air, and an electric source is necessary for heating a heater.

SUMMARY OF THE INVENTION

An object of the present invention is to provide a method for extracting water from the air by which water may be extracted from the air even without a supply of electricity from a power source or even without a supply of fuel, as well as an apparatus therefor.

The present inventors intensively studied to conceive that water may be extracted from the air by utilizing a method in which moisture in the air is absorbed by a rotatable moisture-absorbing rotor; heated air is supplied to a region in the moisture-absorbing rotor which absorbed moisture to thereby regenerate the moisture-absorbing rotor and simultaneously desorb the moisture absorbed by the moisture-absorbing rotor; and the desorbed moisture is condensed to obtain condensed water; and that in this method, not only the heating of the air for regeneration for regenerating the moisture-absorbing rotor, but also the circulation of the air for regeneration in the apparatus may also be carried out by utilizing the solar heat, thereby completing the present invention.

That is, the present invention provides a method for extracting water from air using an apparatus comprising at least a rotatably mounted hygroscopic moisture-absorbing rotor having at least one region through which air can pass in the direction of thickness thereof; a passage for regeneration through which air for regeneration is circulated, of which both ends are opened at the opposing two surfaces of a regeneration region, respectively, the regeneration region being a part of the moisture-absorbing rotor, at which the moisture-absorbing rotor that absorbed moisture is regenerated; and a drain hole for taking out condensed water from the passage for regeneration, which is formed at a lower portion of the passage for regeneration; the method comprising the steps of directly and/or indirectly heating, with sunlight, the air for regeneration to be supplied to the regeneration region of the moisture-absorbing rotor, thereby circulating the air for regeneration through the passage for regeneration and regenerating the moisture-absorbing rotor; cooling the air for regeneration after regenerating the moisture-absorbing rotor to condense moisture therein; and collecting the generated condensed water from the drain hole; the moisture-absorbing rotor being rotated thereby changing the part of the moisture-absorbing rotor, which serves as the regeneration region. The present invention also provides an apparatus for carrying out the method according to the present invention, comprising at least a rotatably mounted hygroscopic moisture-absorbing rotor having at least one region through which air can pass in the direction of thickness thereof; a passage for regeneration through which air for regeneration is circulated, of which both ends are opened at the opposing two surfaces of a regeneration region, respectively, the regeneration region being a part of the moisture-absorbing rotor, at which the moisture-absorbing rotor that absorbed moisture is regenerated; and a drain hole for taking out condensed water from the passage for regeneration, which is formed at a lower portion of the passage for regeneration.

By the present invention, a method by which water may be extracted from the air even without a supply of electricity from a power source or even without a supply of fuel, as well as an apparatus therefor, was provided. By the method and apparatus according to the present invention, water may be extracted from the air using the sunlight alone, so that almost no running costs are necessary and water may be obtained inexpensively. Thus, the present invention is advantageous for tree planting in deserts at which supply of electricity is difficult, and for producing water to be supplied to plants in gardens and balconies at which wirings for electric power transmission or piping for running water is inconvenient.

BRIEF DESCRIPTION OF THE DRAWINGS

FIG. 12 is a front view mainly showing the heating means and the moisture-absorbing rotor in the second embodiment.

FIG. 14 is an enlarged cross-sectional end view of the connection portion between a hygroscopic material region and the passage for regeneration.

BEST MODE FOR CARRYING OUT THE INVENTION

Figure 1:
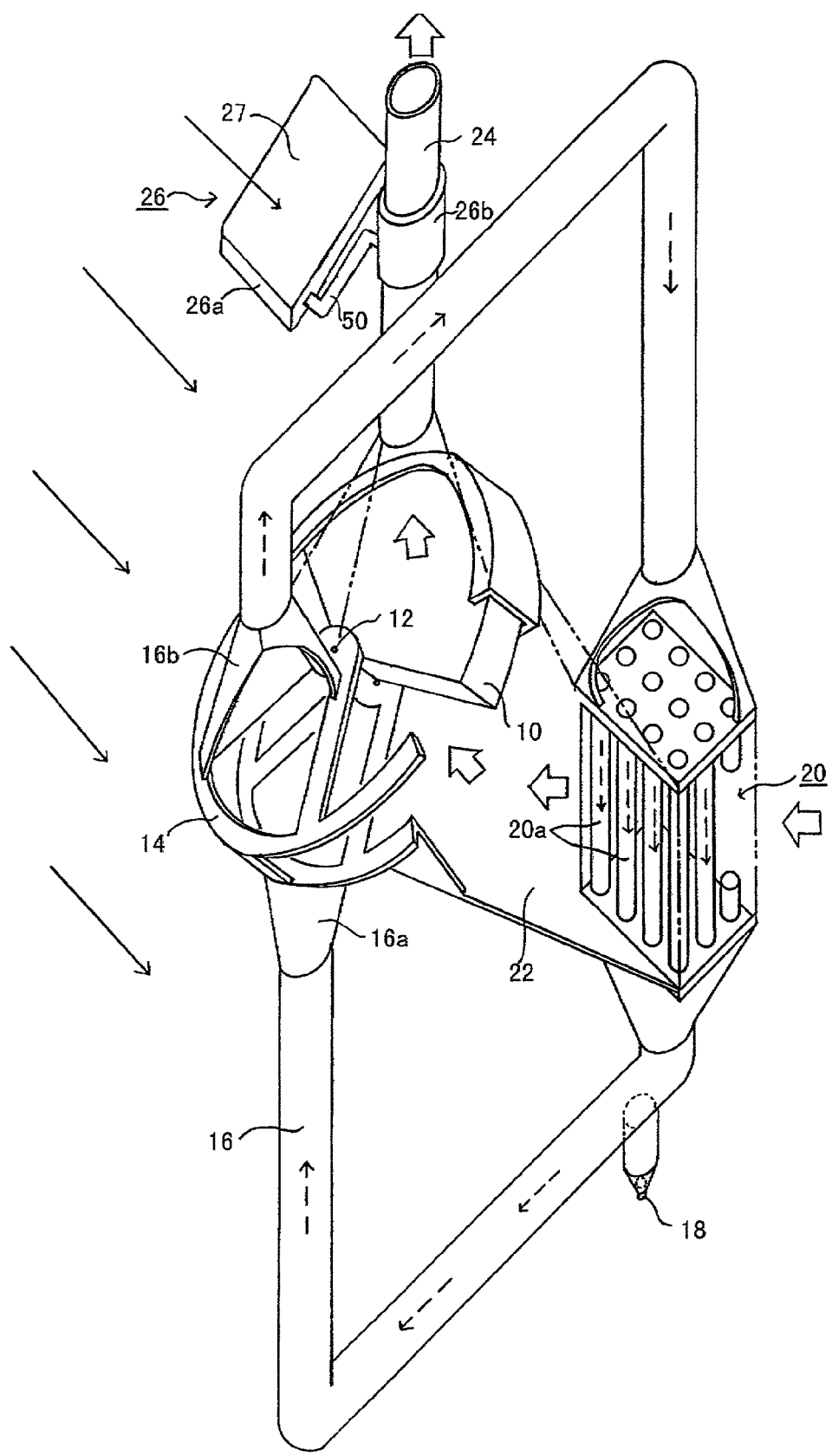
FIG. 1 is a partially cut away perspective view schematically showing a preferred embodiment of the apparatus according to the present invention.

The method and apparatus according to the present invention will now be described referring to the drawings as the best mode for carrying out the invention. FIG. 1 is a partially cut away perspective view schematically showing a preferred embodiment of the apparatus according to the present invention. The apparatus (hereinafter referred to as "water extraction apparatus") for the method of extracting water from the air according to the present invention comprises a moisture-absorbing rotor 10. The moisture-absorbing rotor 10 is rotatably mounted and hygroscopic, through which air can pass through in the direction of thickness thereof. Although the moisture-absorbing rotor 10 is in the form of disk in the preferred embodiment shown in FIG. 1, the moisture-absorbing rotor 10 is not necessarily in the form of a disk. In FIG. 1, a part of the moisture-absorbing rotor 10 is cut away in order to show the structure mounting the moisture-absorbing rotor more comprehensively. The moisture-absorbing rotor 10 may be formed of a porous hygroscopic material. Alternatively, the moisture-absorbing rotor 10 may have a number of thin passages in the direction of thickness thereof, that is, for example, may have a honeycomb or corrugated structure (e.g., the structure similar to that obtained by convoluting a corrugated cardboard), the surfaces of the passages being coated with a hygroscopic material. Still alternatively, the moisture-absorbing rotor 10 may be one obtained by holding moisture absorbent particles in a container made of a mesh or punched metal. Thus, any structure through which air can pass through in the direction of thickness thereof and which is hygroscopic may be employed. Examples of the hygroscopic materials include calcium chloride, lithium chloride, silica gel, zeolite, molecular sieves and active carbon. The moisture-absorbing rotor which absorbs moisture in the air is well-known in the field of dehumidifiers, and a moisture-absorbing rotor widely used in the dehumidifiers of the moisture-absorbing rotor type may preferably be employed. The moisture-absorbing rotor 10 is mounted on a rotating shaft 12 and may be rotatable in one direction or in both directions. In the present specification the term "rotatable" includes "rotatable in one direction" and "rotatable in both directions". The rotating shaft 12 preferably extends in a direction other than vertical direction, as shown in the drawing. The rotating shaft 12 preferably extends in a direction shifted by about 40 to 90 degrees from the vertical direction, that is, preferably extends in an oblique direction or horizontal direction. If the rotating shaft 12 extends in such a direction, the rotating shaft 12 spontaneously rotates due to the weight of the moisture absorbed by the moisture-absorbing rotor 10 without requiring a separate power, which is preferred. That is, the moisture-absorbing rotor 10 spontaneously rotates due to the difference in weight of the regeneration region and the region other than the regeneration region. It should be noted, however, the moisture-absorbing rotor 10 may be rotated by a motor driven by a solar battery. In this case, the rotating shaft 12 may extend in the vertical direction. In the embodiment shown in FIG. 1, the moisture-absorbing rotor 10 is placed in a moisture-absorbing rotor holder 14 comprising a pair of wheel-like skeletons whose centers are coincident with the rotating shaft 12.

With the apparatus according to the present invention, air for moisture absorption containing moisture is made to pass through a partial region (moisture absorption region) of the moisture-absorbing rotor 10 so as to make the moisture-absorbing rotor 10 absorb the moisture contained in the air for moisture absorption. Since the "air for moisture absorption" is the air used for making the moisture-absorbing rotor 10 absorb moisture, the air is called in this way in the present Description. Heated air is made to pass through a region which absorbed the moisture in the air for moisture absorption so that its moisture-absorbing ability was decreased or lost to thereby receive moisture from the region, thereby regenerating the moisture-absorbing rotor 10. The region in the moisture-absorbing rotor, through which the heated air is made to pass is called "regeneration region" in the present Description. The apparatus according to the present invention comprises a passage for regeneration 16 through which air for regeneration is circulated, of which both ends are opened at the opposing two surfaces of a regeneration region, respectively. In the embodiment shown in the drawing, the two opening sections 16*a* and 16*b* which open at the moisture-absorbing rotor 10 are funnel-shaped such that the diameter of a site in the opening section increases as the site is closer to the moisture-absorbing rotor 10. Enlarging the opening section in the funnel-shape is advantageous because a larger region of the moisture-absorbing rotor 10 may be regenerated. However, such an enlarged opening section is not indispensable, and the diameter of the entire passage for regeneration 16 may be made large as such. The portions other than the opening sections 16*a* and 16*b* of the passage for regeneration 16 are preferably closed air-tightly as shown in the drawing.

At a lower portion of the passage for regeneration 16, a drain hole 18 is formed, from which the condensed water is taken out of the passage for regeneration. The drain hole 18 preferably has a structure by which the condensed water may be collected without allowing air flow. Such a structure will be later described in detail.

In the preferred embodiment shown in FIG. 1, a heat exchanger 20 is arranged in the passage for regeneration 16. The heat exchanger 20 comprises a number of pipes 20a through which the air for regeneration passes. As will be described later, the air for regeneration is cooled during the passing through the pipes 20a by exchanging heat with the air for moisture absorption flowing the space among the number of pipes 20a (the passage constituted by the space among the number of pipes 20a will also be hereinafter referred to as "cooling passage"). To harbor a number of the pipes 20a, the heat exchanger 20 preferably has a diameter larger than that of the passage for regeneration 16. In this case, the portions of the passage for regeneration 16 connected to the both ends of the heat exchanger 20, respectively, are enlarged in the form of funnel-shape as shown in the drawings. In FIG. 1, a part of the passage for regeneration 16 connected to the upper face of the heat exchanger 20 is partially cut away such that the end faces of the pipes 20a are shown. Although arranging the heat exchanger 20 is preferred because the efficiency of extraction of water (hereinafter referred to as "water extraction efficiency") is increased, the heat exchanger 20 is not indispensable because the air for regeneration is cooled during it passes through the passage for regeneration 16.

The embodiment shown in the drawing further comprises a passage 22 for supplying air for moisture absorption, whose one end opens at an air for moisture absorption-supplying surface of a moisture absorption region; and a passage 24 for discharging air for moisture absorption, whose one end opens at an air for moisture absorption-discharging surface from which the dehumidified air after passing through the moisture absorption region is discharged. The passage 22 for supplying air for moisture absorption is a wide passage whose one end opens at an air for moisture absorption-supplying surface of a moisture absorption region, to which the air for moisture absorption is supplied, and whose other end opens at a side of the heat exchanger 20. In FIG. 1, the upper edge of the passage 22 for supplying air for moisture absorption is indicated by a two-dot chain. The moisture absorption region of the moisture-absorbing rotor 10 is preferably the entire region other than the above-described regeneration region (excluding, however, a sealing region formed between the both regions for preventing the air for moisture absorption and the air for regeneration from being mixed (cross-sectional area of the clearance*length of the clearance) for the purpose of increasing the water extraction efficiency. On the other hand, the passage 24 for discharging air for moisture absorption is a passage whose one end opens at an air for moisture absorption-discharging surface from which the dehumidified air after passing through the moisture absorption region is discharged, and whose other end opens at the outside of the apparatus as an air outlet. The end of the passage 24 for discharging air for moisture absorption of the side of the moisture-absorbing rotor is enlarged in the funnel-shape as shown in the drawing because the area of the moisture absorption region is large. The periphery of the enlarged portion of the passage 24 for discharging air for moisture absorption is indicated by a two-dot chain. Since the moisture-absorbing rotor 10 is hygroscopic, the moisture-absorbing rotor 10 can absorb moisture from the ambient air and water may be extracted thereby, the passage 22 for supplying air for moisture absorption and the passage 24 for discharging air for moisture absorption are not indispensable (In the description below, the passage 22 for supplying air for moisture absorption and the passage 24 for discharging air for moisture absorption are also collectively referred as simply "passage for moisture absorption").

To an upper part of the passage 24 for discharging air for moisture absorption, a heater 26 is connected. The heater 26 comprises a heat accumulator section 26a having a light-receiving surface 27 which receives sunlight; a heat medium (not shown) which accumulates and transmits heat from sunlight; and a heat-supplying section 26b which supplies the heat of the heat medium to the air for regeneration. In the embodiment shown in the drawing, the heat-supplying section 26b encloses the outer side of a part of the passage 24 for discharging air for moisture absorption. The light-receiving surface 27 is preferably arranged in the direction such that the sunlight impinges on the light-receiving surface 27 in a direction as close as possible to the direction perpendicular to the light-receiving surface 27. Therefore, as shown in FIG. 1, light-receiving surface 27 is usually arranged obliquely and not horizontally. The structure of the heater 26 will be described later in detail.

The above-described structure is preferably enclosed in a housing not shown in order to protect the apparatus from outer force exerted thereto during transportation or installation.

The operation of the above-described water extraction apparatus will now be described. The regeneration region of the moisture-absorbing rotor 10 and the vicinity thereof, that is, the opening sections 16a and 16b of the passage for regeneration 16 and the upper and lower portions close to these opening sections, as well as the light-receiving surface formed on the upper surface of the heat accumulator section 26a of the heater 26 are irradiated with sunlight. In FIG. 1, the sunlight is indicated by solid line arrows. This may easily be accomplished by installing the apparatus such that the above-described portions to be irradiated with the sunlight (hereinafter referred to as "sunlight irradiation portions" for convenience") face the sunlight. Since it is preferred that the portions other than the sunlight irradiation portions be not heated by the solar heat, only the portions of the housing, which cover the sunlight irradiation portions alone may be formed of a transparent material, or the sunlight irradiation portions may be exposed to the outside of the housing. By the solar heat, in the passage for regeneration 16, the side (left front side in FIG. 1) on which the sunlight impinges is heated. As a result, the air for regeneration circulates in the passage for regeneration 16 in the direction indicated by the broken arrows. The principle by which the circulation occurs will be described later.

On the other hand, the heat medium in the heater 26 is heated by the sunlight impinging on the light-receiving surface on the heat accumulator section 26a of the heater 26, and the heated medium moves to the heat-supplying section 26b, thereby the air for moisture absorption contacting the heat-supplying section 26b through the passage 24 for discharging air for moisture absorption is heated. As a result, the heated air for moisture absorption rises due to buoyancy and fresh air for moisture absorption is inhaled from the opening section of the side of the heat exchanger 20 in the passage 22 for supplying air for moisture absorption.

During the air for moisture absorption (hollow arrows) passes through the moisture absorption region of the moisture-absorbing rotor 10, the moisture contained in the air for moisture absorption is absorbed by the moisture-absorbing rotor 10. Due to the moisture absorption, the weight of the moisture absorption region is increased so that the moisture-absorbing rotor 10 is rotated about the rotating shaft 12 by gravity. By this, the portion of the moisture-absorbing rotor which was the moisture absorption region so far is changed to the regeneration region by the rotation. Air for regeneration heated by the solar heat is supplied to the regeneration region of the moisture-absorbing rotor 10 from the enlarged opening section 16a, and passes through the moisture-absorbing rotor 10 in the direction of thickness thereof. During this, the moisture absorbed by the moisture-absorbing rotor 10 is desorbed from the moisture-absorbing rotor 10 by the air for regeneration heated by the solar heat, so that the regeneration region of the moisture-absorbing rotor 10 is regenerated. Simultaneously, the air for regeneration containing the moisture obtained from the moisture-absorbing rotor 10 moves in the passage for regeneration 16 through the enlarged opening section 16b to reach the heat exchanger 20. The air for regeneration passes through the heat exchanger 20 by dividedly passing through the number of pipes 20a. During the passing through the pipes 20a, the air for regeneration exchange heat with the air for moisture absorption inhaled into the passage 22 for supplying air for moisture absorption, so that it is cooled and condensed. The condensed water is discharged from the drain hole 18. By collecting the discharged condensed water, water may be obtained.

Figure 2:
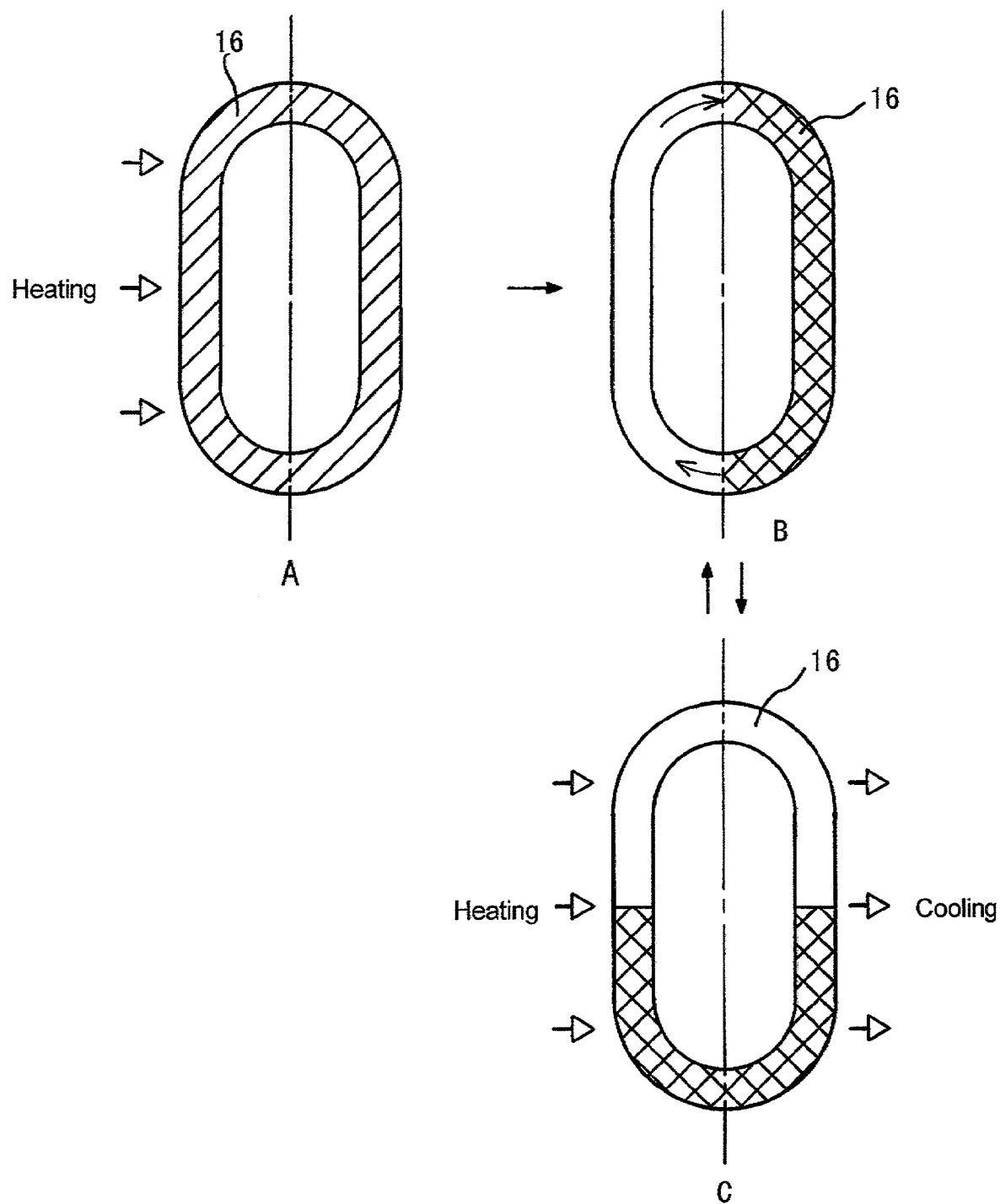
FIG. 2 is a drawing for explaining the principle by which the air for regeneration circulates in a passage for regeneration 16 as shown therein by irradiating the sunlight-irradiation portion alone with sunlight.

The principle by which the air for regeneration circulates in the passage for regeneration 16 as shown in the drawing by irradiating the sunlight irradiation portions alone with sunlight will now be described referring to FIG. 2. In FIG. 2, the passage for regeneration 16 is schematically shown in the form of a race track, and the center is indicated by the dashed line in the center. "A" shows the state before operating the apparatus, and the air for regeneration is indicated by hatching the passage for regeneration 16. In the state before heating, the temperature of the air for regeneration in the passage for regeneration 16 is uniform. The apparatus is operated in the state of "A". That is, the left half portion (in the left of the center line) of the passage for regeneration 16 is irradiated with sunlight to start the heating by the solar heat. By so doing, the air for regeneration in the left half portion of the regeneration region 16 is heated and its temperature is raised. This state is shown in "B". In "B", the heated air for regeneration is shown without hatching, and the relatively cool air for regeneration located in the right half portion of the passage for regeneration 16 is shown by the reticulate hatching. Since the left half portion of the regeneration region 16 alone is heated by the solar heat, the temperature of the air for regeneration in the left half portion of the passage for regeneration 16 alone is raised, and the temperature of the air for regeneration in the right half portion is relatively low. The density of the hot air is decreased due to expansion, and the density of the relatively cool air is larger than that of the hot air. Therefore, since the cold air is heavier than the hot air when the volumes are the same, the cold air comes to the lower side. This state is shown in "C". As shown in "C", the cold air moves to the lower half of the passage for regeneration 16. On the other hand, the hot air moves to the upper half of the passage for regeneration 16 by being pushed by the cold air. Thus, from the state shown in "B", the air for regeneration as a whole is rotated by 90 degrees in the clockwise direction. In this state, by heating the left half portion of the passage for regeneration 16, the state shown in "B", that is, the left half of the passage for regeneration 16 is hot and the right half is relatively cold, again arises. By this, the cold air in the right half portion moves to the lower side by gravity and the state shown in "C" again arises. That is, the air for regeneration rotates further by 90 degrees in the clockwise direction. Thereafter, the states shown in "B" and "C" reciprocates, so that the air for regeneration circulates in the passage for regeneration 16 in the clockwise direction. In the embodiment shown in FIG. 1, once the circulation starts, the air for regeneration in the right half of the passage for regeneration 16 is cooled by the heat exchanger 20, the air for regeneration circulates more effectively. The principle of this circulation was originally discovered by the present inventors, and the fact that the circulation continues has been experimentally confirmed. Since this principle of circulation was discovered according to the present invention, it was first made it possible to extract water from the air without using any power. Since this principle of circulation was not known, in the conventional water extraction apparatus, power is used at least for the circulation of the air for regeneration. It should be noted that although the step (B) in which the temperature changes and the step (C) in which the air moves are separately shown for the purpose of easier comprehension, the state "B" and the state "C" occur continuously and slowly in the actual operation.

Preferred mode of each constituent of the above-described apparatus according to the present invention will now be described more concretely. First, the drain hole 18 formed at a lower portion of the passage for regeneration 16 is described. As described above, the drain hole 18 preferably has a structure by which the condensed water may be collected without allowing air flow. By employing such a structure, the mixing of the air for regeneration and the air for moisture absorption in the vicinity of the regeneration region and the moisture absorption region in the moisture-absorbing rotor 10 may be inhibited.

Figure 3:
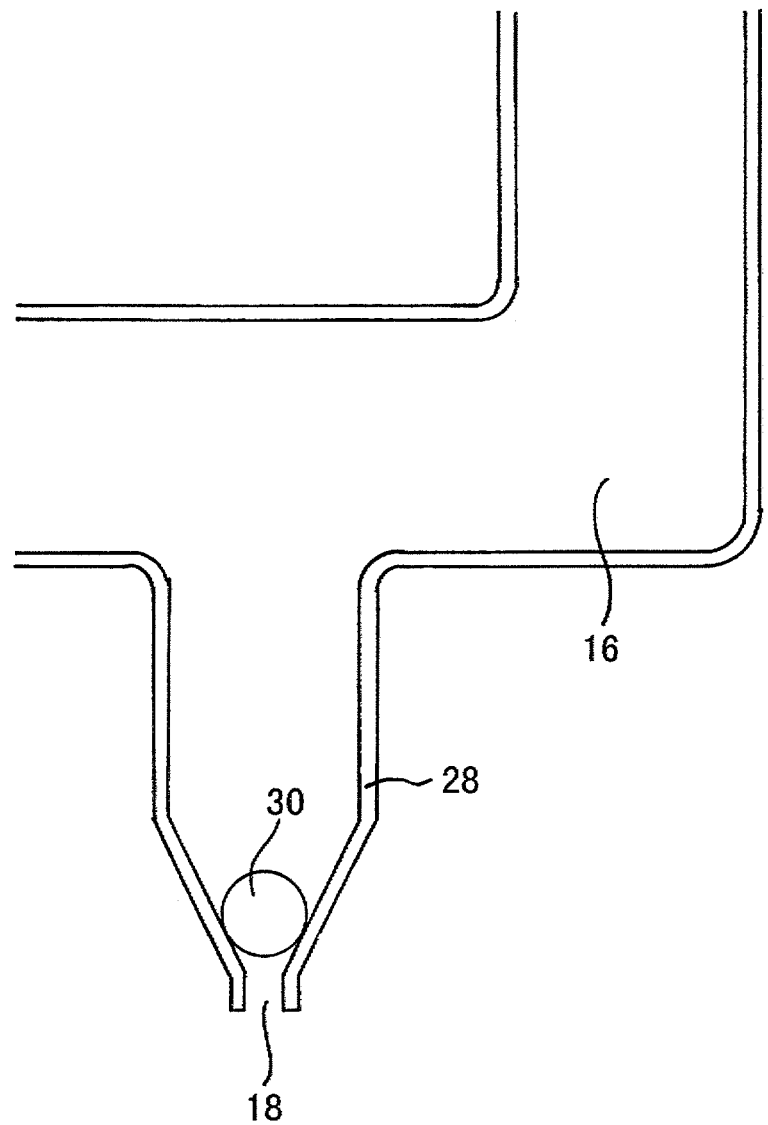
FIG. 3 is a cross-sectional end view schematically showing a preferred embodiment of a structure by which condensed water may be collected without allowing air flow.

A preferred embodiment of the structure by which the condensed water may be collected without allowing air flow is shown in FIG. 3. FIG. 3 is a cross-sectional end view of the vicinity of the drain hole 18 formed at a lower portion of the passage for regeneration 16. The passage for regeneration 16 is branched at its lower portion to form a drain duct 28. The tip of the drain duct 28 is tapered. In the tapered tip of the drain duct 28, a float 30 having a density smaller than water is arranged. The diameter of the float 30 is larger than the diameter of the drain hole 18 at the tip of the drain duct 28, so that the float 30 does not fall from the drain hole 18. In the state wherein no or almost no condensed water has been accumulated, the drain hole 18 is air-tightly clogged with the float 30, so that the air does not flow through the drain hole 18. Although the condensed water which was condensed in the passage for regeneration 16 or the heat exchanger 20 comes into the drain duct 28, the condensed water is not discharged to the outside because the bottom portion of the drain duct 28 is clogged by the float 30, so that the condensed water starts to be accumulated on the contact portion between the float 30 and the drain duct 28. When a prescribed amount of the condensed water accumulates, the float 30 starts to float due to buoyancy. When the condensed water further flows into the drain duct 28, the surface tension between the float 30 and the drain duct 28 is broken, so that the condensed water is discharged to the outside through the drain hole 18. After the condensed water is thus discharged to the outside, the surface tension restores, and the drain hole 18 is clogged by the water film between the drain hole 18 and the float 30. With this structure, the drain hole 18 is always clogged with the float 30, so that the condensed water may be collected without allowing air flow.

Figure 4:
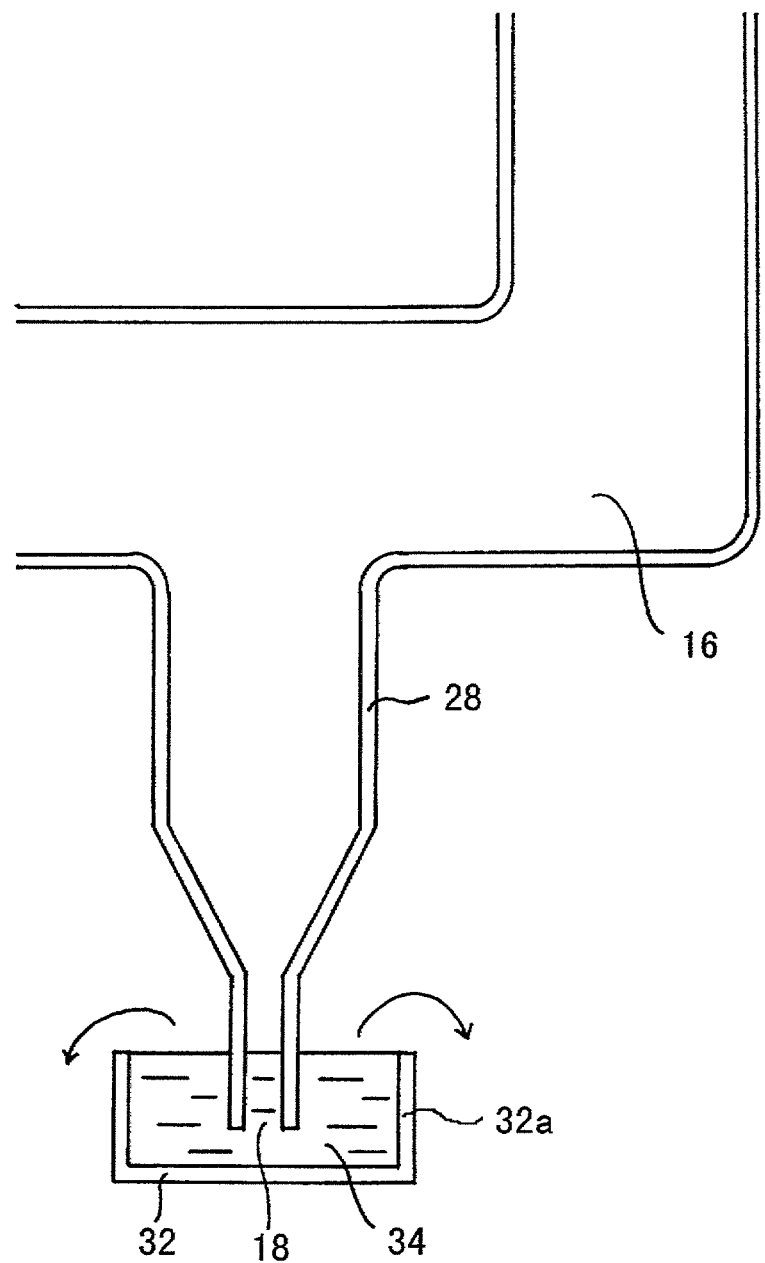
FIG. 4 is a cross-sectional end view schematically showing another preferred embodiment of a structure by which condensed water may be collected without allowing air flow.

Another preferred embodiment of the structure by which the condensed water may be collected without allowing air flow is shown in FIG. 4. FIG. 4 is a cross-sectional end view of the vicinity of the drain hole 18 formed at a lower portion of the passage for regeneration 16. The passage for regeneration 16 is branched at its lower portion to form a drain duct 28, and the tip of the drain duct 28 is tapered. Under the tapered tip of the drain duct 28, a condensed water-receiving vessel 32 is arranged. The condensed water-receiving vessel 32 has a depth such that the drain hole 18 is submerged in the condensed water 34 when the condensed water 34 is accumulated therein, and is arranged in such a position. In other words, the top portion of the wall 32a of the condensed water-receiving vessel 32 is higher than the drain hole 18. With this structure, when the condensed water accumulates in the condensed water-receiving vessel 32 through the drain hole 18, the drain hole 18 becomes submerged in the condensed water 34. Under this condition, air flow through the drain hole 18 does not occur. When the condensed water 34 further accumulates, the condensed water 34 starts to overflow from the top portion of the condensed water-receiving vessel 32 as indicated by the arrows in FIG. 4. By collecting the overflown water, water may be extracted from the air. With this structure, after the drain hole 18 is once submerged in the condensed water 34, the air flow through the drain hole 18 does not occur at all, so that the condensed water may be collected without allowing air flow.

Figure 5:
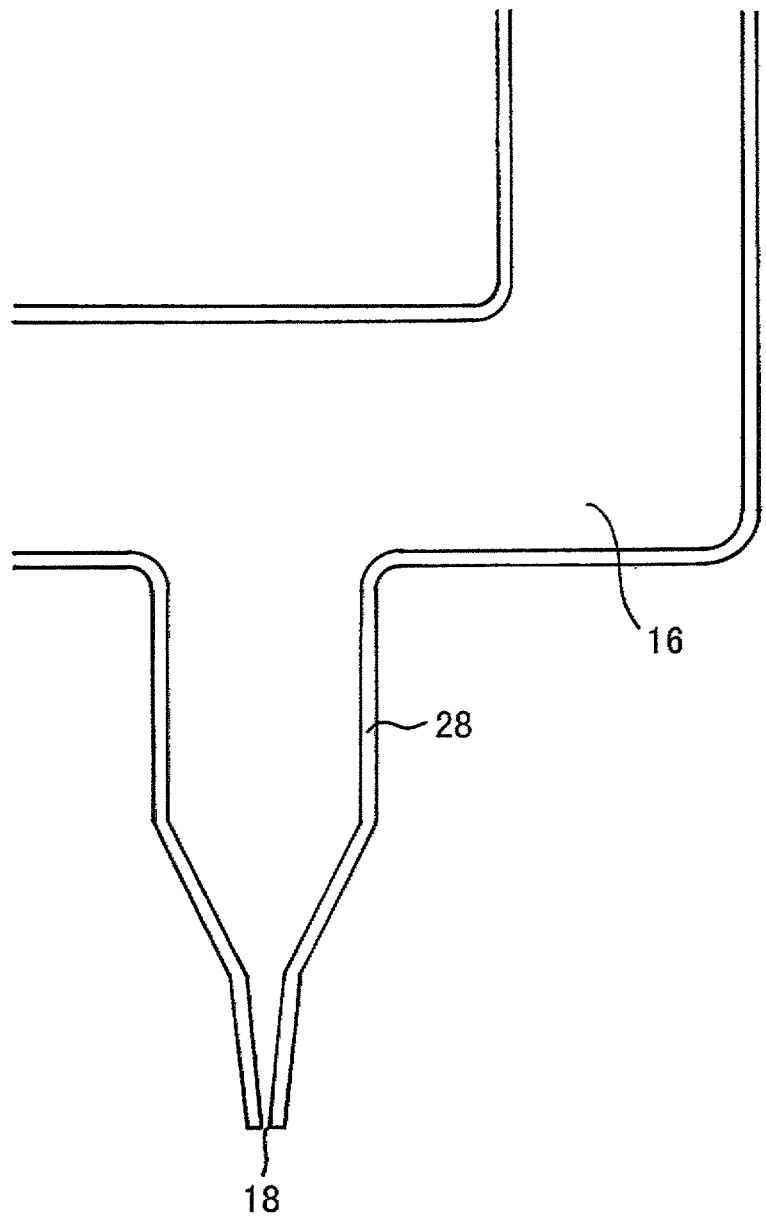
FIG. 5 is a cross-sectional end view schematically showing still another preferred embodiment of a structure by which condensed water may be collected without allowing air flow.

Another preferred embodiment of the structure by which the condensed water may be collected without allowing air flow is shown in FIG. 5. FIG. 5 is a cross-sectional end view of the vicinity of the drain hole 18 formed at a lower portion of the passage for regeneration 16. The passage for regeneration 16 is branched at its lower portion to form a drain duct 28, and the tip of the drain duct 28 is tapered. The tip of the drain duct 28 is very thin, so that the diameter of the drain hole 18 is very small. In this case, the diameter of the drain hole 18 is preferably about 1 mm to 4 mm. With this structure, even if condensed water reaches the drain hole 18 through the drain duct 28, since the diameter of the drain hole 18 is small, the condensed water does not fall immediately from the drain hole 18 because of the surface tension, and accumulates in the upper space of the drain hole 18, thereby the drain hole 18 is clogged air-tightly. When the amount of the condensed water in the upper space of the drain hole 18 is further increased so that the downward pressure is increased, the pressure overcomes the surface tension so that the condensed water is discharged from the drain hole 18. However, after a certain amount of the condensed water is discharged, the discharge is stopped again due to the surface tension of the water at the drain hole 18. Thus, after the drain hole 18 is once clogged with the condensed water, the drain hole 18 is continuously clogged air-tightly by the surface tension of the condensed water, so that the air flow is inhibited. Thus, the condensed water may be collected without allowing air flow.

Figure 6:
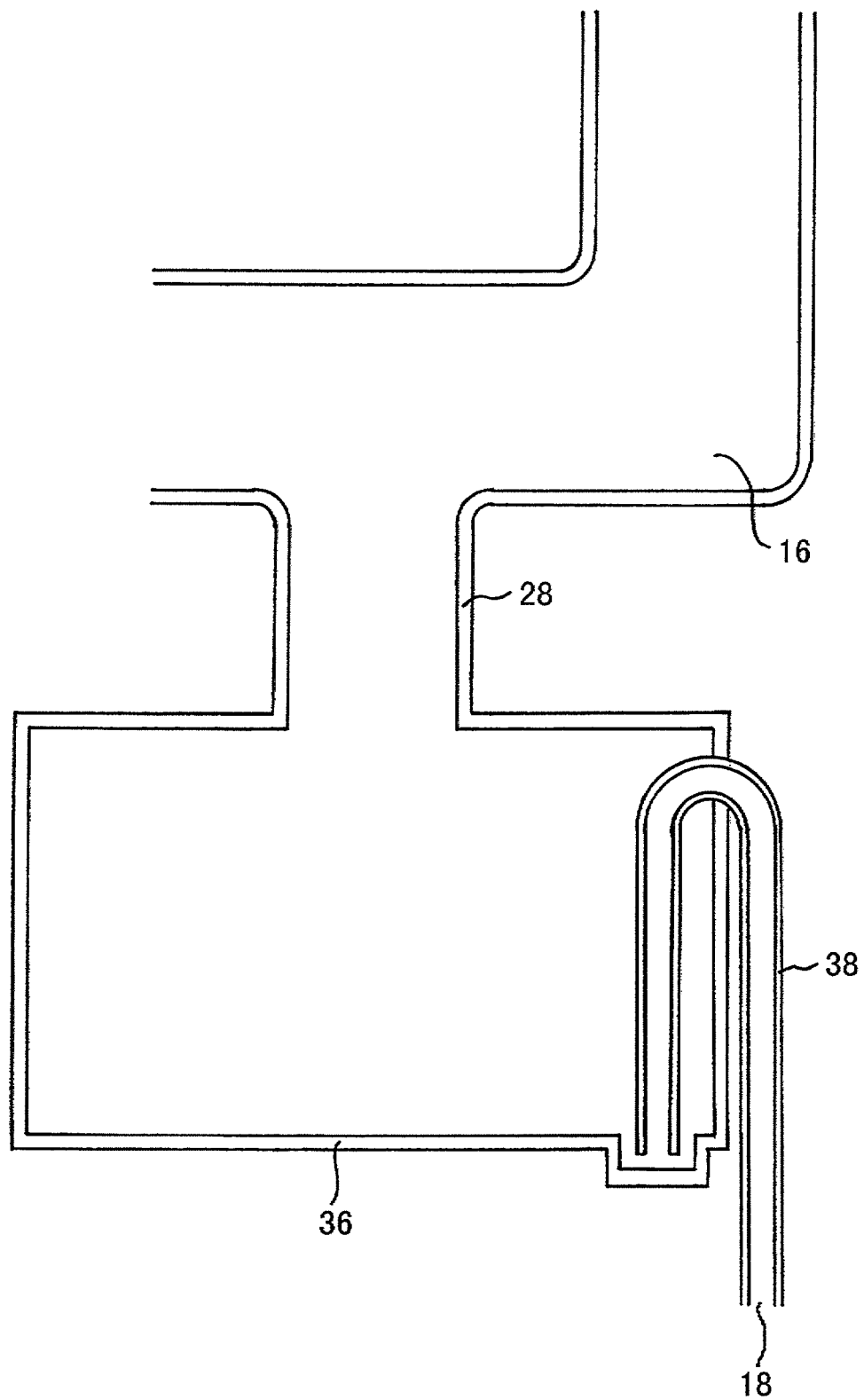
FIG. 6 is a cross-sectional end view schematically showing still another preferred embodiment of a structure by which condensed water may be collected without allowing air flow.

Another preferred embodiment of the structure by which the condensed water may be collected without allowing air flow is shown in FIG. 6. FIG. 6 is a cross-sectional end view of the vicinity of the drain hole 18 formed at a lower portion of the passage for regeneration 16. The passage for regeneration 16 is branched at its lower portion to form a drain duct 28, and the tip of the drain duct 28 is enlarged to form a tank 36 having a bottom. From the bottom portion of the tank 36, a reversed U-shaped siphon 38 extends to the outside of the tank 36. The top portion of the siphon 38 is lower than the top portion of the tank 36. The condensed water after passing through the drain duct 28 first accumulates in the tank 36. When the level of the condensed water rose to a position higher than the top portion of the siphon 38, the condensed water is discharged from the drain hole 18 through the siphon 38. With this structure, the end of the siphon 38 located in the tank 36 is always submerged in the condensed water accumulated in the concaved portion in the bottom of the tank 36, so that the air flow through the drain hole 18 is inhibited. Therefore, the condensed water may be collected without allowing air flow.

Figure 7:
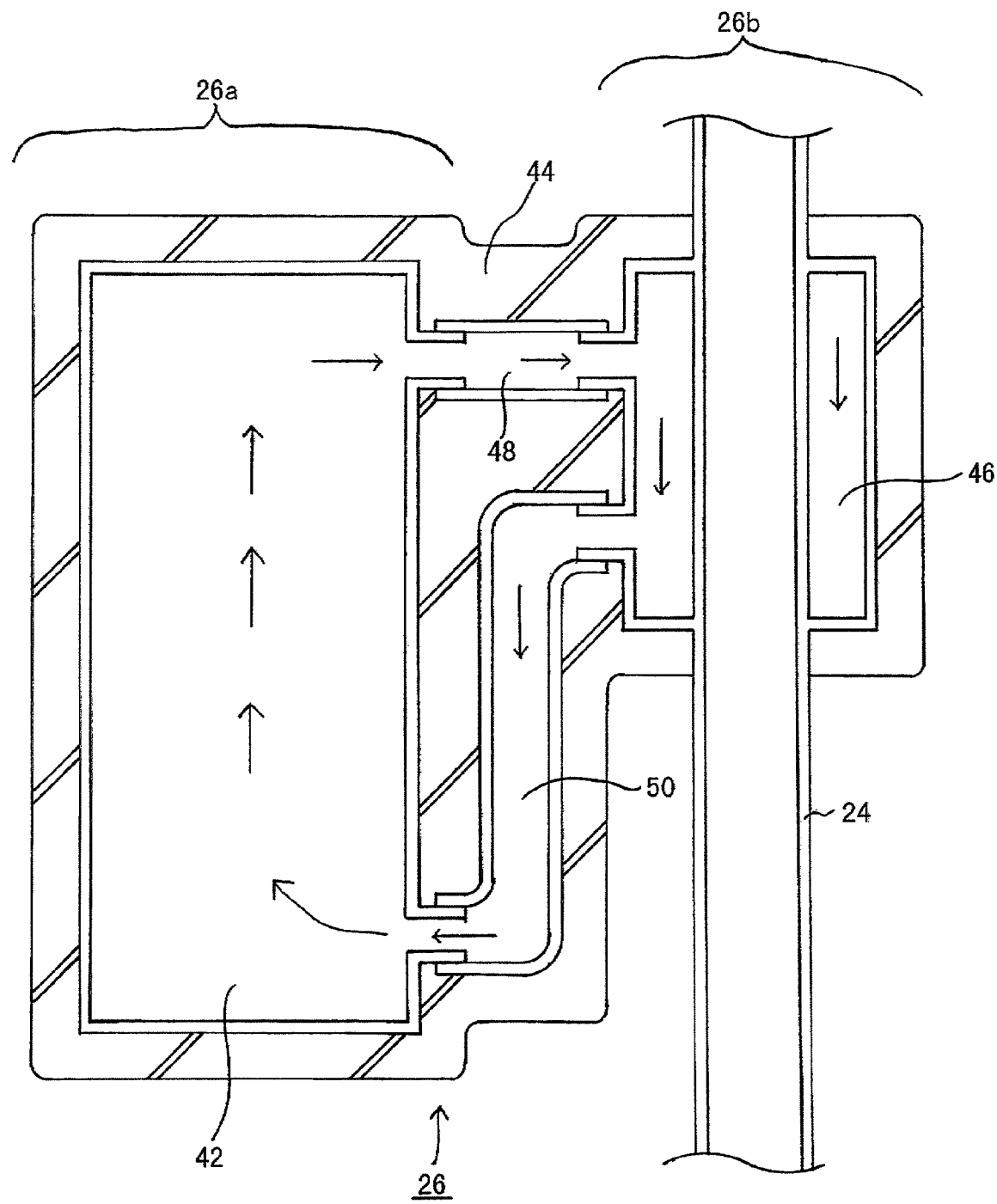
FIG. 7 is a cross-sectional end view of a preferred embodiment of a heater 26.

A preferred structure of the above-described heater 26 will now be described in detail referring to FIG. 7. FIG. 7 is a cross-sectional end view of a preferred embodiment of the heater 26. In FIG. 7, to show the structure more clearly, the heat accumulator section 26a, and an upper connecting duct 48 and a lower connecting duct 50 described below are sectioned such that the light-receiving surface is cut away in parallel with the light-receiving surface of the heat accumulator section 26a, and the passage 24 for discharging air for moisture absorption and the heat-supplying section 26b are cut away along the vertical cutting plane. As described above, the heater 26 comprises the heat accumulator section 26a having the light-receiving surface 27 (see FIG. 1. In FIG. 7, the light-receiving surface is located in front of a heat-accumulating vessel 42 (described below) (i.e., the side three-dimensionally protruding from the paper of the thawing); a heat medium which accumulates and transmits the solar heat; and the heat-supplying section 26b which supplies the heat of the heat medium to the air for regeneration. The light-receiving surface is formed of a transparent or black glass or plastic. In the former case, the heat medium or the plate opposite to the light-receiving surface is preferably black. The outer surface other than the light-receiving surface is covered with a heat-insulating material 44 (not shown in FIG. 1). The heat accumulator section 26a comprises a heat-accumulating vessel 42. The heat-supplying section 26b comprises a heat-radiating vessel 46 enclosing a part or the entire outer periphery of the passage 24 for discharging air for moisture absorption. The heat accumulator section 26a and the heat-supplying section 26b are connected through two ducts, that is, an upper connecting duct 48 and a lower connecting duct 50. It should be noted that the light-receiving surface may be formed on both the upper surface and the lateral surface of the heat-accumulating vessel 42. Although the heat medium is not indicated by hatching or the like for the purpose of clarity, heat medium is filled in the entire of the heat-accumulating vessel 42, heat-radiating vessel 46, the upper connecting duct 48 and the lower connecting duct 50. As the heat medium, water is preferred. Depending on the district where the apparatus is installed, an antifreeze treatment is necessary.

The heat medium located at the upper portion of the heat-accumulating vessel 42 is heated by the sunlight impinging on the light-receiving surface 27. The heat is transmitted to the upper portion of the heat-radiating vessel 46. The heat in the upper portion of the heat-radiating vessel 46 is radiated to the passage 24 for discharging air for moisture absorption, so that the air for moisture absorption in the passage 24 for discharging air for moisture absorption is heated. On the other hand, the heat medium which radiated the heat to the passage 24 for discharging air for moisture absorption is cooled and moves downwardly in the heat-radiating vessel 46 due to convection. Since the heat medium radiates heat to the heat-radiating vessel 46 during the move, the temperature of the heat medium decreases as it goes down. On the other hand, heated medium is freshly supplemented to the upper portion of the heat-radiating vessel 46 through the upper connecting duct 48. Therefore, the flow of the heat medium indicated by the arrows in FIG. 7 occurs, and the heat medium circulates in the heat-accumulating vessel 42, upper connecting duct 48, heat-radiating vessel 46 and the lower connecting duct 50 in the order mentioned. By this, the heat medium heated at the heat accumulator section 26a moves to the heat-supplying section 26b, so that the passage 24 for discharging air for moisture absorption and, in turn, the air for moisture absorption flowing therein are heated. The heat medium which radiated the heat again circulates into the heat accumulator section 26a where it is heated, and moves again to the heat-supplying section 26b where it radiates heat. Thus, the air for moisture absorption flowing in the passage 24 for discharging air for moisture absorption is continuously heated. Thus, the portion of the passage 24 for discharging air for moisture absorption upper than the heat-supplying section 26b is preferably insulated because the given heat does not escape to the outside (not shown in FIGS. 1 and 7).

Various preferred modifications of the water extraction apparatus according to the present invention will now be described.

To increase the heating efficiency of the portions of the passage for regeneration 16, the surfaces of the enlarged opening section 16a, the portion of the passage for regeneration 16 immediately therebelow, the regeneration region of the moisture-absorbing rotor 10, the enlarged opening 16b and the portion of the passage for regeneration 16 immediately thereabove may be made black to promote the absorption of the solar heat. In cases where the regeneration region of the moisture-absorbing rotor 10 is made black, it is preferred to make the opening section 16b transparent. In this case, a member through which air can pass through, such as mesh, punched metal, slit or the like, may be placed immediately above the regeneration region, and/or the moisture-absorbing rotor 10 may be made black and the enlarged portion of the passage 24 for discharging air for moisture absorption may be made to be a member which blocks the solar heat. Alternatively, the portion of the passage to be heated may be made transparent and a black pipe or plate may be placed therein. The portions not heated by the sunlight, in the opening sections 16a and 16b, the portions of the passage for regeneration 16, which portions are adjacent to the opening sections 16a and 16b, and extend in the upper and lower direction, and the horizontal upper portion of the passage for regeneration 16 are preferably heat-insulated. An intermediate portion of the passage may be made into the form of a panel so as to increase the surface area which receives the solar heat. In the embodiment shown in FIG. 1, the heater 26 used for heating the passage 24 for discharging air for moisture absorption may be arranged in the passage for regeneration 16 (in this case, the air for regeneration is also indirectly heated by the sunlight). That is, it is preferred to arrange the heater in both the passage 24 for discharging air for moisture absorption and in the passage for regeneration 16. In cases where the heater 26 is arranged in the passage for regeneration 16, the heater 26 is preferably arranged in the opening section 16a or the portion of the passage for regeneration 16 immediately therebelow. Alternatively, in order to prevent the moisture in the air for regeneration with high humidity after the regeneration from being condensed in the upper space of the moisture-absorbing rotor 10 so as to drop on the moisture-absorbing rotor 10, the heater 26 may be arranged in the opening section 16b or in the portion of the passage for regeneration 16 immediately thereabove.

In the above-described embodiment, the heat-supplying section 26b of the heater 26 encloses the outer side of a duct (passage 24 for discharging air for moisture absorption in the embodiment shown in FIG. 1), the heat-supplying section 26b may be arranged within the duct. By so doing, the heating efficiency is further increased. In this case, the upper connecting duct 48 and the lower connecting duct 50 may be made such that they penetrate the wall of the duct. Further, as shown in the embodiment shown in FIG. 7, in cases where the heat-radiating vessel 46 encloses the outer side of a duct, the duct may be provided with irregularities or with fins thereby increasing the surface area of the duct in order to increase the efficiency of the radiation of heat to the duct. Further, protrusion(s) made of a material having a high heat conductivity or hollow protrusion(s) in which heat medium is passed through may be protruded from the heat-radiating vessel 46 and the protrusion(s) may be inserted into the duct.

The heat accumulator section 26a may be fixed or may be capable of facing the sun manually or automatically. Since the cooling efficiency is high in the night, the solar heat during the day may be accumulated in a heat accumulator, and water may be extracted in the night. For this, a countermeasure(s) such that the heat-accumulating vessel 42 is made large, a plurality of the heat-accumulating vessels 42 having the light-receiving surface 27 are arranged, or the like may be taken.

A second preferred embodiment will now be described referring to the drawings. The second embodiment has the following features:

(1) Since the passage for regeneration is air-tightly connected to the regeneration region so that the regeneration region and the moisture absorption region are completely separated, the efficiency of water extraction is further increased.

(2) The embodiment comprises a heat exchanger for heat recovery, which exchanges heat between the air for regeneration immediately after passing through the moisture-absorbing rotor and the air for regeneration after condensation, so that the heat utilization efficiency and, in turn, the efficiency of water extraction are further increased.

(3) The embodiment comprises a heater which receives sunlight and heats the air for regeneration before passing through the regeneration region, by which the temperature of the air for regeneration passing through the regeneration region is raised, so that the efficiency of the regeneration of the regeneration region (i.e., extraction of moisture from the regeneration region) and, in turn, the efficiency of water extraction are increased.

(4) The embodiment comprises a heating means which heats the air for regeneration before passing through the regeneration region utilizing the high air temperature during the day, by which the temperature of the air for regeneration passing through the regeneration region is raised, so that the efficiency of the regeneration of the regeneration region (i.e., extraction of moisture from the regeneration region) and, in turn, the efficiency of water extraction are increased.

(5) The embodiment comprises a heat exchanger for cooling which exchange heat between the air for regeneration after passing through the regeneration region and after passing the heat exchanger for heat recovery and the outer atmosphere, by which condensation of the moisture in the air for regeneration is promoted, so that the efficiency of water extraction is increased.

(6) The embodiment comprises a cooling means which cools the air for regeneration after passing through the heat exchanger for cooling, by which the condensation of the moisture in the air for regeneration is further promoted, so that the efficiency of water extraction is increased.

Although the second embodiment is an extremely preferred embodiment which comprises all of the above features (1) to (6), and with which the water extraction efficiency is largely increased, since each of the features (1) to (6) respectively exhibits the effect for increasing the efficiency of water extraction, embodiments comprising optional one or more features (1) to (6) are also preferred embodiments.

In the description below, the term "front side" means the direction of the lower heater 58 when viewed from the moisture-absorbing rotor 10, the term "rear side" means the direction opposite thereto, the term "right side" means the side in which hygroscopic material regions 10b and 10c are positioned when the moisture-absorbing rotor 10 is viewed from the front side, and the term "left side" means the side opposite thereto, that is, the side in which hygroscopic material regions 10a and 10d are positioned when the moisture-absorbing rotor 10 is viewed from the front side.

Figure 8:
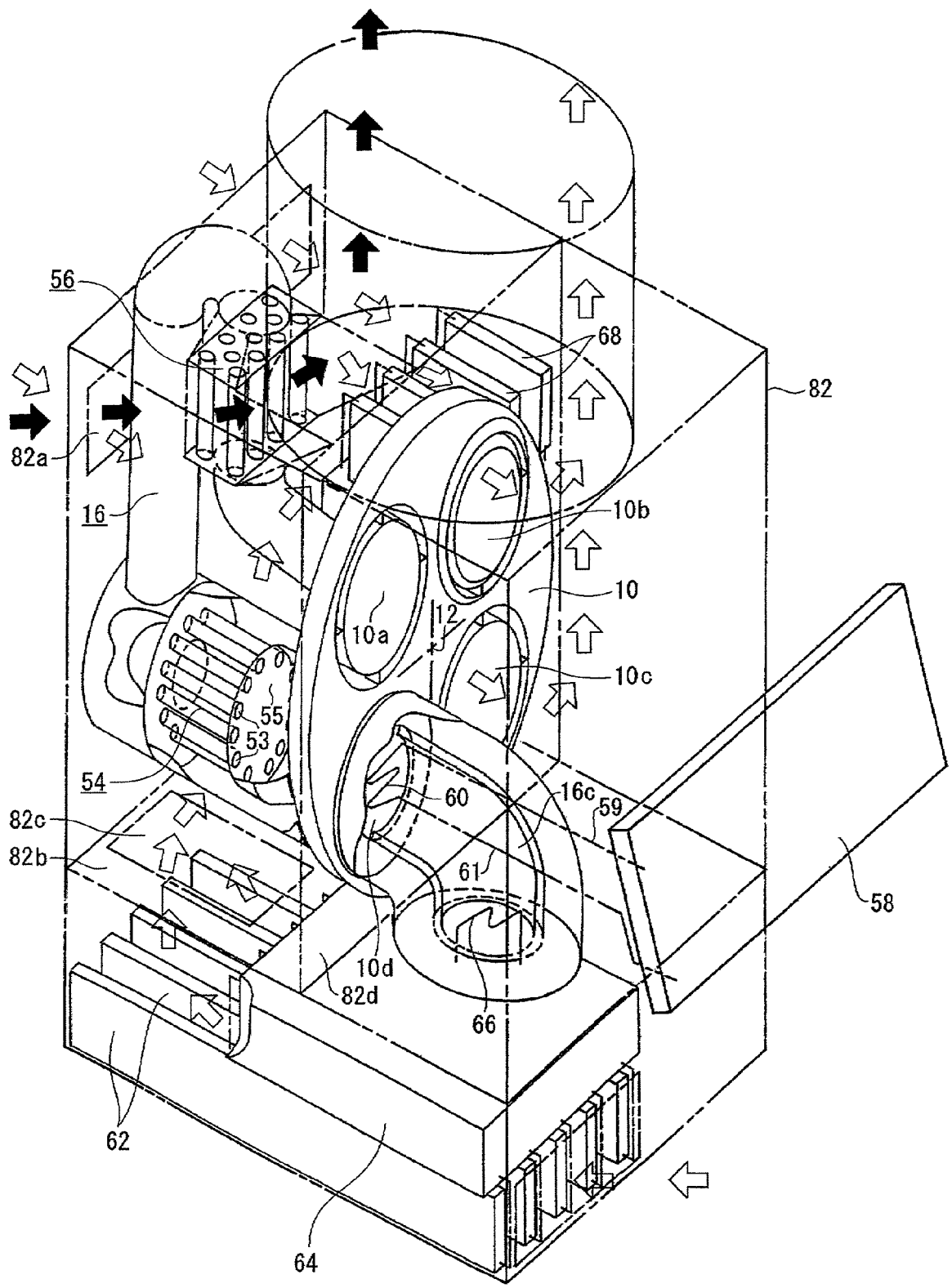
FIG. 8 is a partially cut away perspective view showing a second preferred embodiment of the apparatus according to the present invention.
Figure 9:
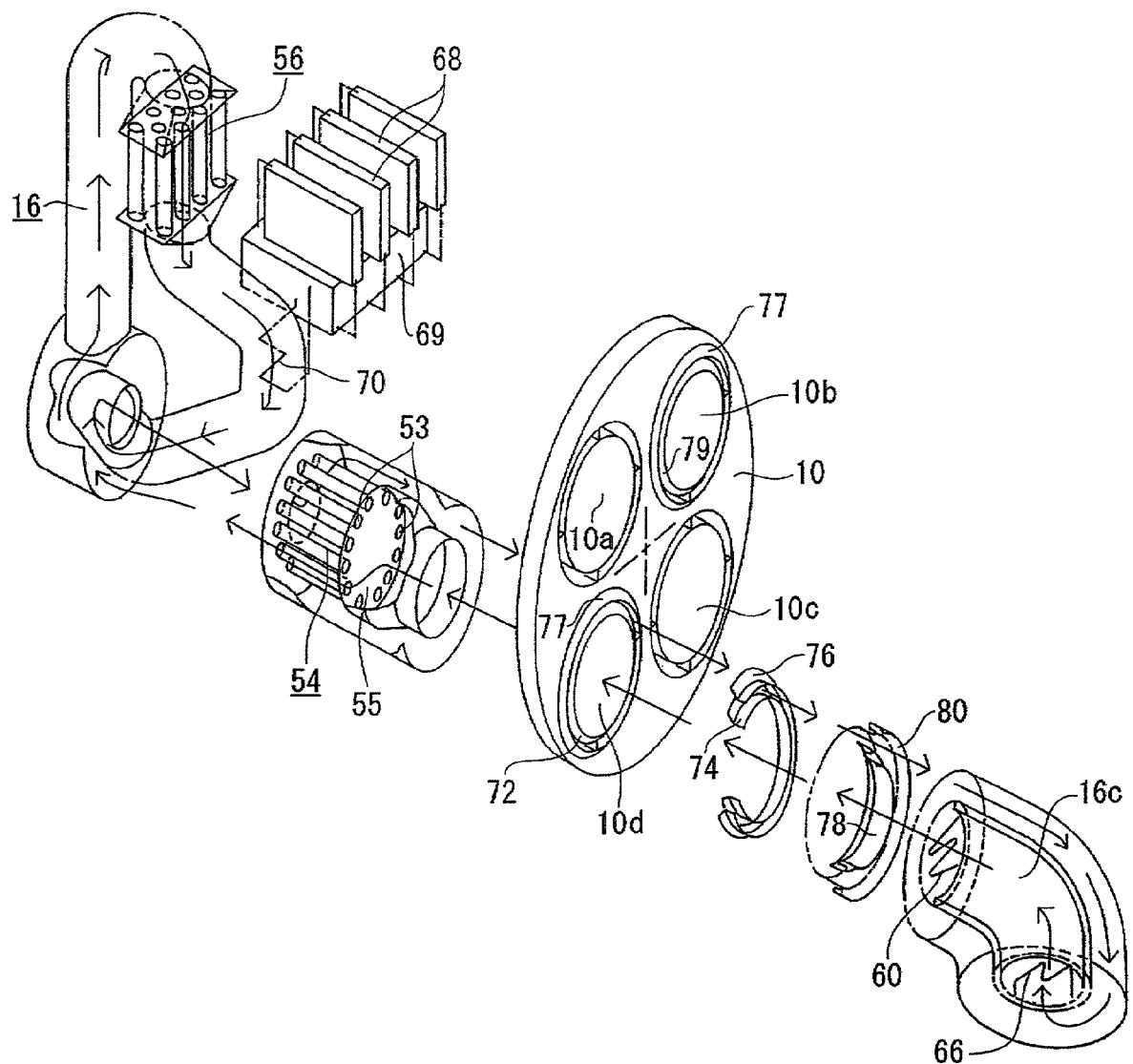
FIG. 9 is an exploded view of a passage for regeneration of the second embodiment.
Figure 10:
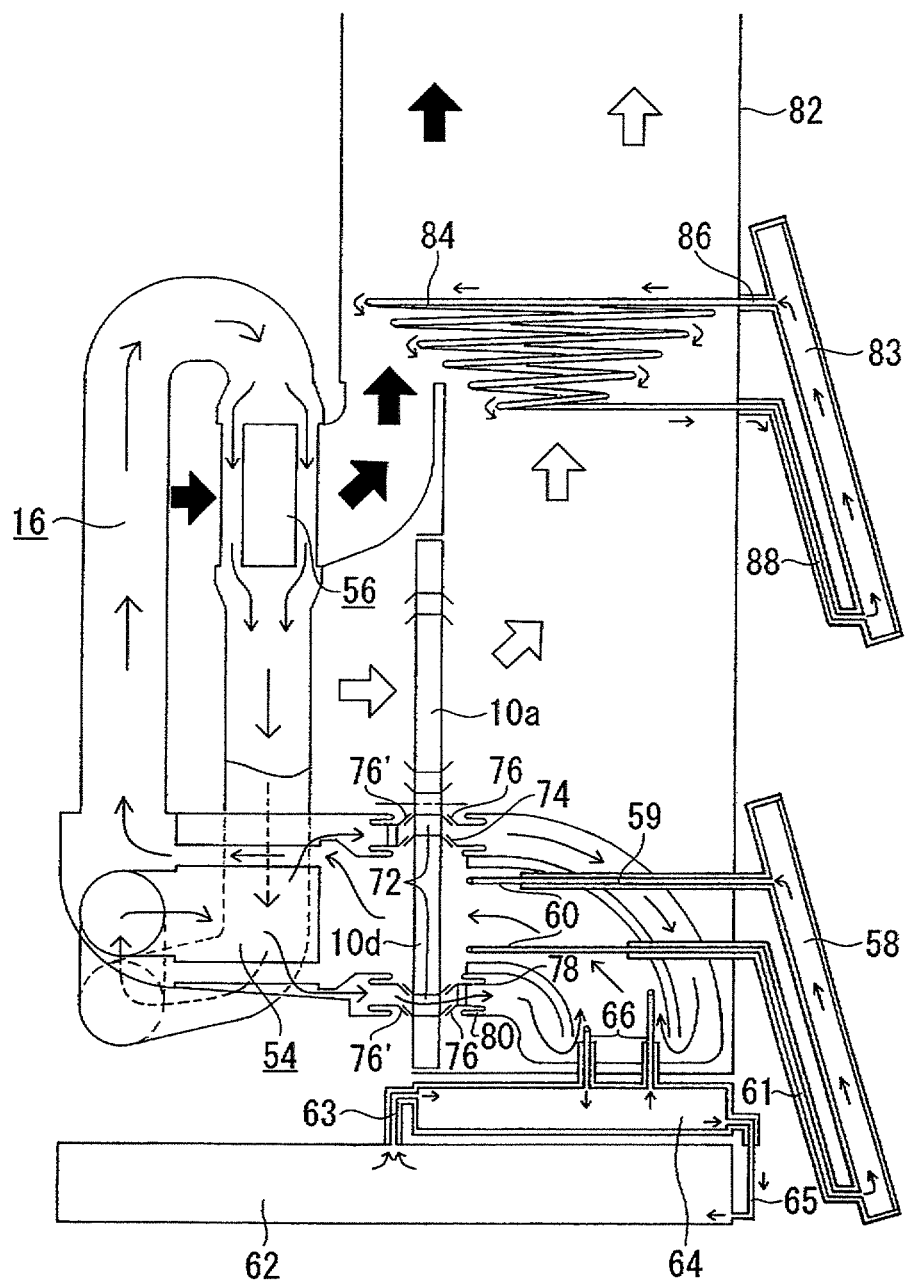
FIG. 10 is a side cross-sectional view of the second embodiment.

FIG. 8 is a partially cut away perspective view of the second embodiment. FIG. 9 is an exploded view of the passage for regeneration in the second embodiment. FIG. 10 is a side sectional view of the second embodiment. The summary of the second embodiment is first described mainly referring to these drawings, and then the details of each constituent will be described referring also to other drawings of FIG. 11 and the drawings thereafter. In FIG. 8 and the drawings thereafter, each constituting member corresponding to the constituting member of the first embodiment shown in FIGS. 1 to 7 is denoted by the same reference numeral as in FIGS. 1 to 7.

The water extraction apparatus according to the second embodiment comprises a moisture-absorbing rotor 10. In the moisture-absorbing rotor 10, the regions (hereinafter referred to as "hygroscopic material regions" for convenience) made of a hygroscopic material through which air can pass through in the direction of thickness thereof are the four circular regions denoted by reference numerals 10a, 10b, 10c and 10d, respectively. That is, the four circular regions denoted by reference numerals 10a, 10b, 10c and 10d alone are made of a hygroscopic material and other portion of the moisture-absorbing rotor 10 is a simple plate. In other words, the moisture-absorbing rotor 10 has four circular through holes, and four hygroscopic material regions are arranged in the through holes, respectively. The four hygroscopic material regions have the same size and the centers thereof are arranged on a circle whose center is coincident with the rotating shaft 12 at regular intervals. The number of the hygroscopic material regions may be about 2 to 8, and may, for example, also be fan-shaped or the like and not circular. In the second embodiment shown in the drawings, there is a clearance (hygroscopic material outer periphery passage 72, details thereof will be described later) between the outer periphery of each circular hygroscopic material region and the inner periphery of each through hole mentioned above. Through this hygroscopic material outer periphery passage 72, the air for regeneration passes (the circulation route of the air for regeneration will be described later in detail). Each hygroscopic material is suspended within each through hole described above by four hygroscopic material-holding plates 75 (FIG. 12). FIG. 8 shows the state wherein the hygroscopic material region 10d among the four hygroscopic material regions is connected to the passage for regeneration 16 and is being regenerated. The front side of the hygroscopic material region 10d is air-tightly connected to the end face of a heating section 16c constituting a part of the passage for regeneration 16. The heating section 16c of the passage for regeneration 16 is in the form of a double duct whose cross-section is concentric, the inner duct being connected to the hygroscopic material region 10d and the outer duct whose cross-section is annular is connected to the above-described hygroscopic material outer periphery passage 72. The rear surface of the hygroscopic material region 10d is air-tightly connected to the vicinity of a heat exchanger for heat recovery 54. In the state shown in FIG. 8, the hygroscopic material region 10d is air-tightly incorporated into the passage for regeneration 16 and is regenerated. However, when the hygroscopic material regions 10b and 10c which are absorbing moisture become heavier due to the absorption of the moisture, the moisture-absorbing rotor 10 is rotated and the hygroscopic material region 10c moves to the position of the hygroscopic material region 10d shown in FIG. 8, where the hygroscopic material region 10c is air-tightly connected to the passage for regeneration 16 and is regenerated. The cycle of air-tight connection between the hygroscopic material region and the passage for regeneration 16—rotation of the moisture-absorbing rotor 10 and release of the air-tight connection—air-tight connection between the next hygroscopic material region and the passage for regeneration 16, is repeated. This is attained by moving back and forth the connection portion of the passage for regeneration, connected to the hygroscopic material region by a cam mechanism utilizing the rotating force of the moisture-absorbing rotor 10. This cam mechanism, the air-tight connection and release thereof will be later described in detail. The reason why the heating section 16c has the double duct structure is to increase the heat efficiency. More particularly, the temperature of the air for regeneration flowing through the outer duct is higher than that of the ambient air because of passing through the heat exchanger for heat recovery 54. However, since the air for regeneration flowing through the inner duct is hotter, the heat leaked from the inner duct is recovered by the outer duct by enclosing the inner duct with the outer duct. By this, the temperature of the air for regeneration flowing in the outer duct is further increased, so that the loss of heat from the air for regeneration may be made smaller when compared with the case wherein the inner duct is directly exposed. The inner duct itself has also a double duct structure whose cross-section is concentric, and both ends of this inner duct in the inner duct opens, and the end of the side of the moisture-absorbing rotor alone of the outer duct whose cross-section is annular is closed, so that heat-insulation effect by the air layer is obtained.

In the heating section 16c of the passage for regeneration 16 located in the front side of the hygroscopic material region 10d, a lower heat-supplying member 60 connected to a lower heater 58 through an upper connecting duct 59 and a lower connecting duct 61 is arranged, by which the air for regeneration immediately before the regeneration of the hygroscopic material region 10d is heated. Further, in the heating section 16c, a heat radiator 66 connected to heat-absorbing panels 62 through a warm water bath 64 is arranged, by which also the air for regeneration is heated. On the other hand, in the passage for regeneration 16 in the rear side of the hygroscopic material region 10d, the heat exchanger for heat recovery 54 is arranged, by which heat is exchanged between the air for regeneration after regenerating the hygroscopic material region 10d and the air for regeneration after condensation of moisture. The passage for regeneration 16 vertically rises from the rear side of the heat exchanger for heat recovery 54, and descends after U-turn at the top portion. In the portion immediately after the descent, a heat exchanger for cooling 56 is arranged. In the heat exchanger for cooling 56, heat is exchanged between the air for regeneration and the ambient air, so that the air for regeneration is cooled to form dew. In the lower side of the heat exchanger for cooling 56, a heat-absorber 70 connected to heat-radiating panels 68 through a cold water bath 69 (FIG. 9) is arranged, by which the air for regeneration is further cooled to form dew. Although not shown in FIG. 8 for simplifying the drawing, in the upper space in a housing 82, an upper heat-supplying member 84 connected to an upper heater 83 through an upper communication duct 86 and a lower communication duct 88 is arranged, as shown in FIG. 10.

The flow of the air for regeneration is indicated by arrows in FIG. 9. The air for regeneration heated by a heat radiator 66 and the lower heat-supplying member 60 in the heating section 16c (the inner duct of the concentric double duct) of the passage for regeneration 16 passes through the hygroscopic material region 10d and receives moisture from the hygroscopic material region 10d to regenerate it, thereby becoming humid. The air for regeneration after passing through the hygroscopic material region 10d enters first passages 53 of the heat exchanger for heat recovery 54 and cooled by the heat exchange with the air for regeneration after condensation of moisture. However, the air for regeneration is still hotter than the ambient air, and ascends the vertical portion of the passage for regeneration 16 after exiting the heat exchanger for heat recovery 54, and descends after U-turn at the top portion, followed by being cooled by passing through the heat exchanger for cooling 56, thereby a part of the moisture is condensed. The air for regeneration further descends the passage for regeneration 16 and is cooled by the heat-absorber 70, thereby further forming dew. The air for regeneration then enters the second passage (the space between the first passages 53 of the heat exchanger for heat recovery 54), and is heated by the heat exchange. The air for regeneration then passes through the hygroscopic material outer periphery passage 72 and then through the outer duct of the concentric double duct in the heating section 16c, and enters the inner region of the double duct in the heating section 16c after U-turn at the lower portion to return to the initial position. This cycle is repeated. The formed condensed water is then collected from a drain duct not shown formed at the lowest portion in the passage for regeneration 16 without allowing air flow. The reason why the air for regeneration flows is because of the difference in the density of the air for regeneration due to the difference in temperature as described referring to FIG. 2, further details thereof being described later.

On the other hand, as shown in FIG. 10, in the upper space of the housing 82, mainly in the upper space in the front side (although a part extends up to the rear side) of the moisture-absorbing rotor 10, the upper heat-supplying member 84 is arranged, by which the air in the housing 82 is heated to form an ascending air current, and the air inhaled from the outside of the housing 82 through a window 82a (FIG. 8) of the housing 82 and the air inhaled from the outside of the housing 82 through a hole 82c formed in a lower partition plate 82b after passing through the space among the heat-absorbing panels 62 (the inhaled air is the air for moisture absorption) pass through the hygroscopic material regions 10b and 10c where the moisture is absorbed. The flow of the air for moisture absorption is indicated by wide hollow arrows in FIGS. 8 and 10. On the other hand, a part of the ambient air inhaled into the housing 82 through the window 82a opened in the housing due to the same ascending air current passes through the other passage (the space among the many pipes through which the air for regeneration passes) of the heat exchanger for cooling 56 where it exchanges the heat with the air for regeneration (wide black arrows shown in FIGS. 8 and 10). When the hygroscopic material regions 10b and 10c become heavier due to moisture absorption, the moisture-absorbing rotor is rotated and the hygroscopic material region 10c moves to the position of the hygroscopic material region 10d shown in FIG. 8, where the hygroscopic material region 10c is regenerated in the same manner as described above. By virtue of the cam mechanism described below, the rotation occurs intermittently.

The above is the summary of the constitution and operation of the second embodiment. Each of the constituting elements will now be described dividedly in more detail.

(1) Air-Tight Connection Between Hygroscopic Material Region and Passage for Regeneration, and Rotation of Moisture-Absorbing Rotor An enlarged cross-sectional end view of the connection portion between the hygroscopic material region 10d and the passage for regeneration is shown in FIG. 14. In the drawing, the upper side is the front side of the apparatus. FIG. 14A shows the state in which the hygroscopic material region 10d is not air-tightly connected to the passage for regeneration, and FIG. 14B shows the state in which the hygroscopic material region 10d is air-tightly connected to the passage for regeneration.

In the outer periphery portion of the hygroscopic material region 10d, an annular inner male sealing plate 79 protruding in the front and inner oblique direction of the hygroscopic material region 10d is formed. Similarly, an annular inner male sealing plate 79' protruding in the rear and inner oblique direction of the hygroscopic material region 10d is formed. Since the front and rear faces of the hygroscopic material regions have symmetrical structures, and since the operation is also the same, the structure of the front side and its operation alone will be described hereinbelow. On the outer periphery of the circular through hole harboring the hygroscopic material region 10d, in the moisture-absorbing rotor 10, an annular outer male sealing plate 77 protruding in the front and inner oblique direction, similar to the above-described inner male sealing plate 79, is formed. On the oblique surface of the inner male sealing plate 79, an O-ring 90 for promoting the air tightness is formed. Similarly, on the oblique surface of the outer male sealing plate 77, an O-ring 92 for promoting the air tightness is formed. As described above, the heating section 16c of the passage for regeneration 16 has a concentric double duct structure. To the end of the inner duct 16d thereof, an inner female sealing plate 74 is connected through an annular flexible member 78. The flexible member 78 preferably consists of an elastic material and urges the inner female sealing plate 74 to the direction of the hygroscopic material region 10d. Since the inner female sealing plate 74 is to be air-tightly connected to the inner male sealing plate 79 (see FIG. 14B), the oblique surface thereof is parallel with the oblique surface of the inner male sealing plate 79. To the outer duct 16e of the double duct structure, an outer female sealing plate 76 is connected through an annular flexible member 80. The flexible member 80 preferably consists of an elastic material and urges the outer female sealing plate 76 to the direction of the hygroscopic material region 10d. Since the outer female sealing plate 76 is to be air-tightly connected to the outer male sealing plate 77 (see FIG. 14B), the oblique surface thereof is parallel with the oblique surface of the outer male sealing plate 77. A pin 94 whose cross-section is circular is arranged on the outer female sealing plate 76 in the side of the rotating shaft 12 of the moisture-absorbing rotor 10, which pin 94 extends in the direction parallel with the surface of the moisture-absorbing rotor 10 and in the direction of the rotating shaft 12 of the moisture-absorbing rotor 10. On the outer female sealing plate 76 at the side of the outer periphery of the moisture-absorbing rotor 10, a pin 96 whose cross-section is circular is arranged, which extends in the direction parallel with the surface of the moisture-absorbing rotor 10 and in the direction of the outer periphery of the moisture-absorbing rotor 10. In the vicinity of the rotating shaft 12 of the moisture-absorbing rotor 10, a cylindrical inner cam wall 98 is formed, whose center is coincident with the rotating shaft 12 of the moisture-absorbing rotor 10, and a cam groove 100 is formed in the outer surface of the inner cam wall 98. The tip portion of the pin 94 slidably engages with the cam groove 100, and moves along the cam groove 100 as the moisture-absorbing rotor 10 rotates. Similarly, on the outer periphery of the moisture-absorbing rotor 10, a cylindrical outer cam wall 102 is formed, and a cam groove 104 is formed in the inner surface of the outer cam wall 102. The tip portion of the pin 96 slidably engages with the cam groove 104, and moves along the cam groove 104 as the moisture-absorbing rotor 10 rotates. The outer female sealing plate 76 and the inner female sealing plate 74 are connected through a plurality of connecting members not shown at some of the portions thereof, such that when the outer female sealing plate 76 moves, the inner female sealing plate 74 also moves in parallel therewith. It is preferred that the movement of the outer female sealing plate 76 and the movement of the inner female sealing plate 74 be defined only in the direction back and forth with respect to the hygroscopic material region, by holding the outer female sealing plate 76 in the inner side of the outer duct 16e of the double duct structure, through the flexible member 80, and by holding the inner female sealing plate 74 in the inner side of the inner duct 16d of the double duct structure, through the flexible member 78.

Figure 15:
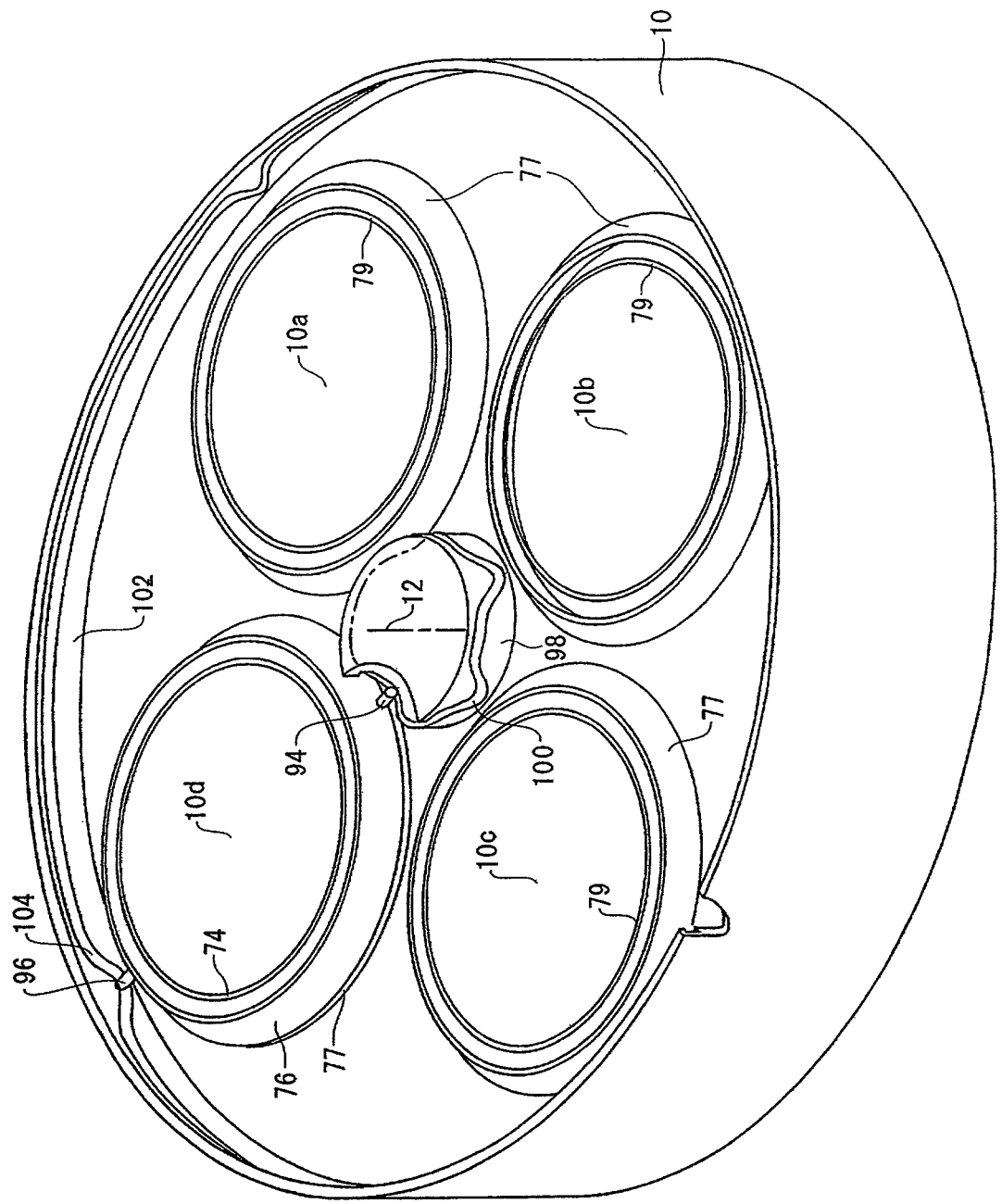
FIG. 15 is a partially cut away perspective view for explaining a cam mechanism in the second embodiment.
Figure 16:
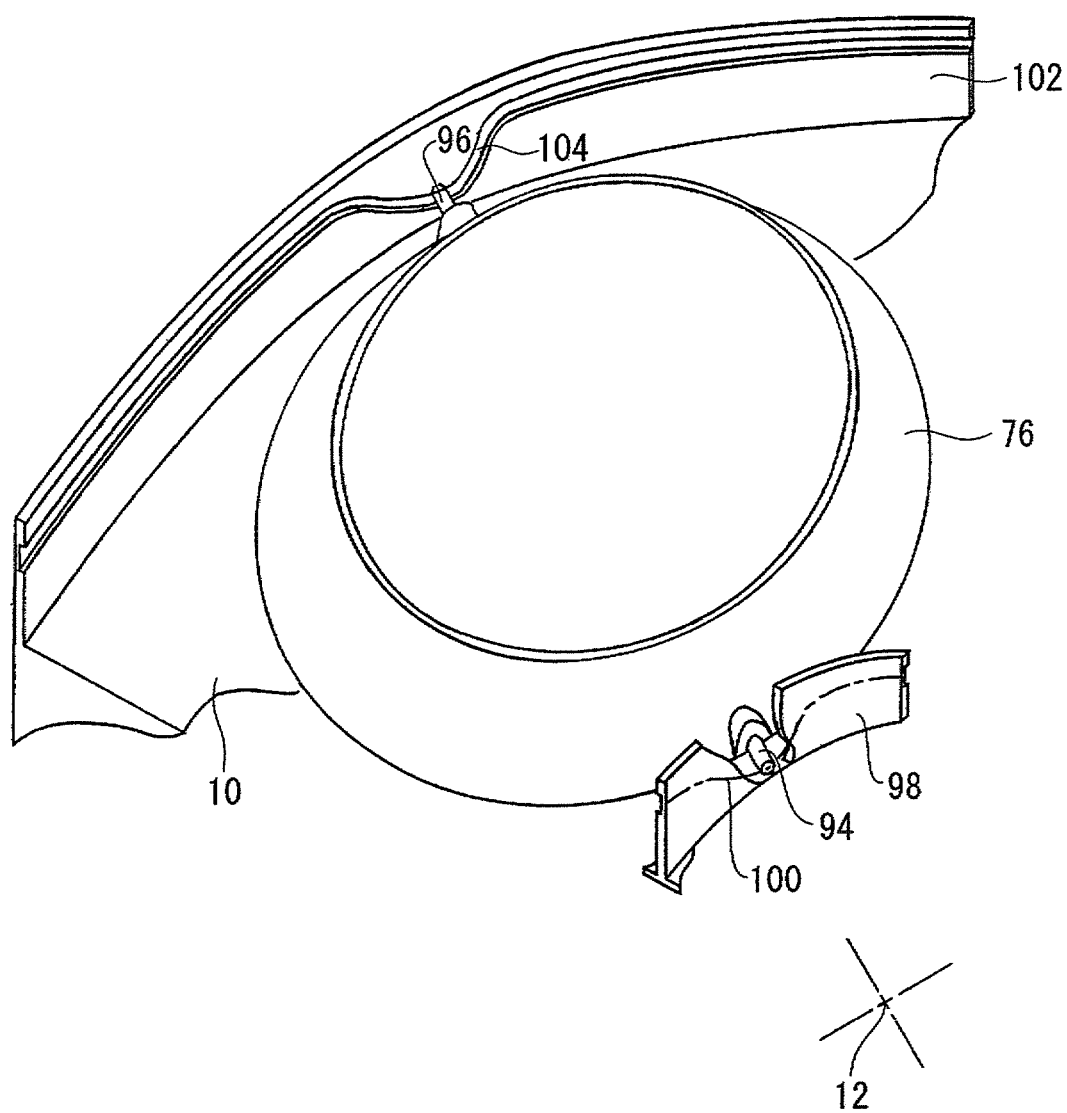
FIG. 16 is a partially cut away perspective view showing the vicinity of the hygroscopic material region 10*d* in FIG. 15.

FIGS. 15 and 16 show partially cut away perspective views for showing the cam mechanism. FIG. 16 shows the vicinity of the hygroscopic material region 10d shown in FIG. 15. FIGS. 15 and 16 show the state wherein the male sealing plates 79 and 77, and the female sealing plates 74 and 76 are connected air-tightly, respectively (i.e., the state shown in FIG. 14B). As shown in FIGS. 15 and 16, the rotating shaft 12 of the moisture-absorbing rotor 10, the pin 94 and the pin 96 are aligned on one straight line. The cam grooves 100 and 104 are formed such that the positions of the pins 94 and 96 during the air-tight connection come to the center of the valleys, respectively. The slope of the valley in the cam groove 100 (indicated by a dashed line in FIG. 16, and partly indicated by a dashed line in FIG. 15) is formed to be identical with the slope of the sealing plates. Since the portions in the cam grooves other than the valley portions are substantially flat, the slope of the valley portions are steeper than the other portions. The cam groove 100 and the cam groove 104 are formed to be similar figure whose centers are coincident with the rotating shaft 12 such that when the pin 94 come to the valley position, the pin 96 also comes to the valley position.

The operation will now be described. In the air-tightly connected state, as shown in FIGS. 15 and 16, the pin 94 and the pin 96 are positioned at the valley portion of the cam grooves 100 and 104, respectively. In FIG. 14B too, the cam grooves 100 and 104 are located at a lower position. In this situation, the hygroscopic material region 10d is regenerated, and moisture absorption is carried out at the hygroscopic material regions 10b and 10c whose weights increases due to the absorption of moisture by the hygroscopic material. If the hygroscopic material region 10a absorbs moisture, a torque opposite to the torque caused by the increase in the weights of the hygroscopic material regions 10b and 10c is generated. Therefore, it is preferred to arrange a screen plate not shown which covers the entire surface of the hygroscopic material region 10a so as to prevent air from passing through the hygroscopic material region 10a. Further, since the air for moisture absorption freely passes through the hygroscopic material outer periphery passages 72 of the hygroscopic material regions 10b and 10c, it is preferred to arrange annular screen plates not shown which cover the entire hygroscopic material outer periphery passages 72 (the center region covering the hygroscopic material region is open), respectively, so that the air for moisture absorption passes through substantially the hygroscopic material regions 10b and 10c alone. As the weights of the hygroscopic material regions 10b and 10c increase, the pins 94 and 96 relatively ascend the slope in the cam grooves 100 and 104 to leave the valleys and reach the plateau of the cam grooves 100 and 104. In this situation, since the cam grooves 100 and 104 are at a high position (i.e., a position far away from the surface of the moisture-absorbing rotor 10), the female sealing plates 76 and 74 are apart from the male sealing plates 77 and 79, respectively, so that the air-tight connection is released and the rotational move of the hygroscopic material regions becomes easy. The state shown in FIG. 14A is the state in which the air-tight connection is released, and the cam grooves 100 and 104 are at a high position. Since the plateau regions of the cam grooves 100 and 104 are flat, once the pins 94 and 96 leave the valleys in the cam grooves 100 and 104 to reach the plateau, the moisture-absorbing rotor 10 rotates quickly without substantial resistance, and stops when the pins 94 and 96 are fitted in the valleys of the cam grooves 100 and 104, respectively. As described above, since the slopes of the valley portions are relatively steep, if the pins 94 and 96 of the hygroscopic material region 10c are once fitted in the valleys, they cannot get out of the valleys unless the weights of the hygroscopic material regions 10a and 10b increase to a considerable level by moisture absorption. Therefore, the hygroscopic material region 10c dwells for a while in the state of being air-tightly connected to the passage for regeneration 16, during which the hygroscopic material region 10c is regenerated. In other words, the moisture-absorbing rotor 10 intermittently rotates such that the time during which the hygroscopic material region is air-tightly connected is long and the time during which it rotates is much shorter than that. The above-described cycle is repeated and the regeneration of each hygroscopic material region is automatically carried out sequentially.

Figure 17:
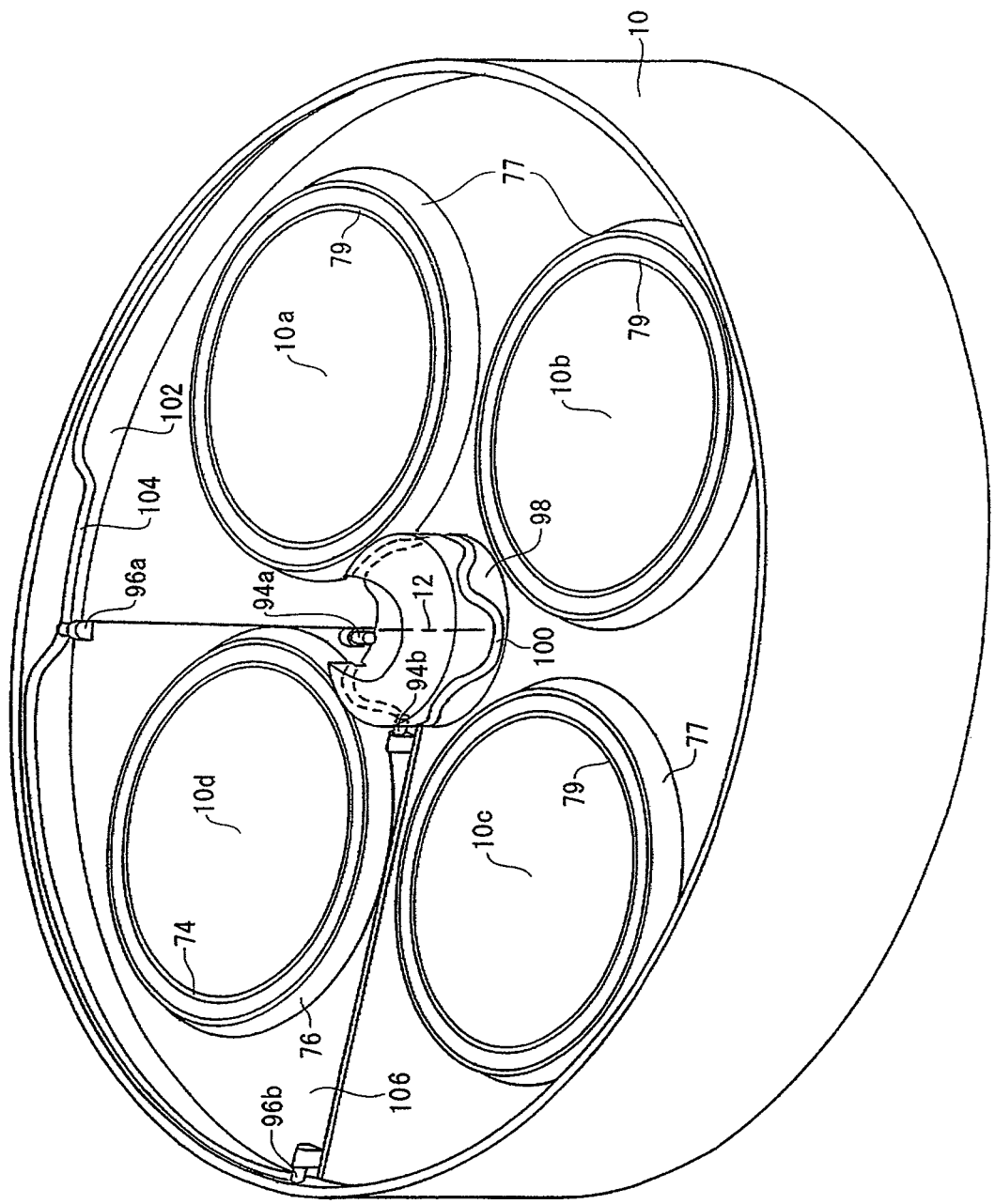
FIG. 17 is a partially cut away perspective view for explaining another mode of the cam mechanism in the second embodiment.
Figure 18:
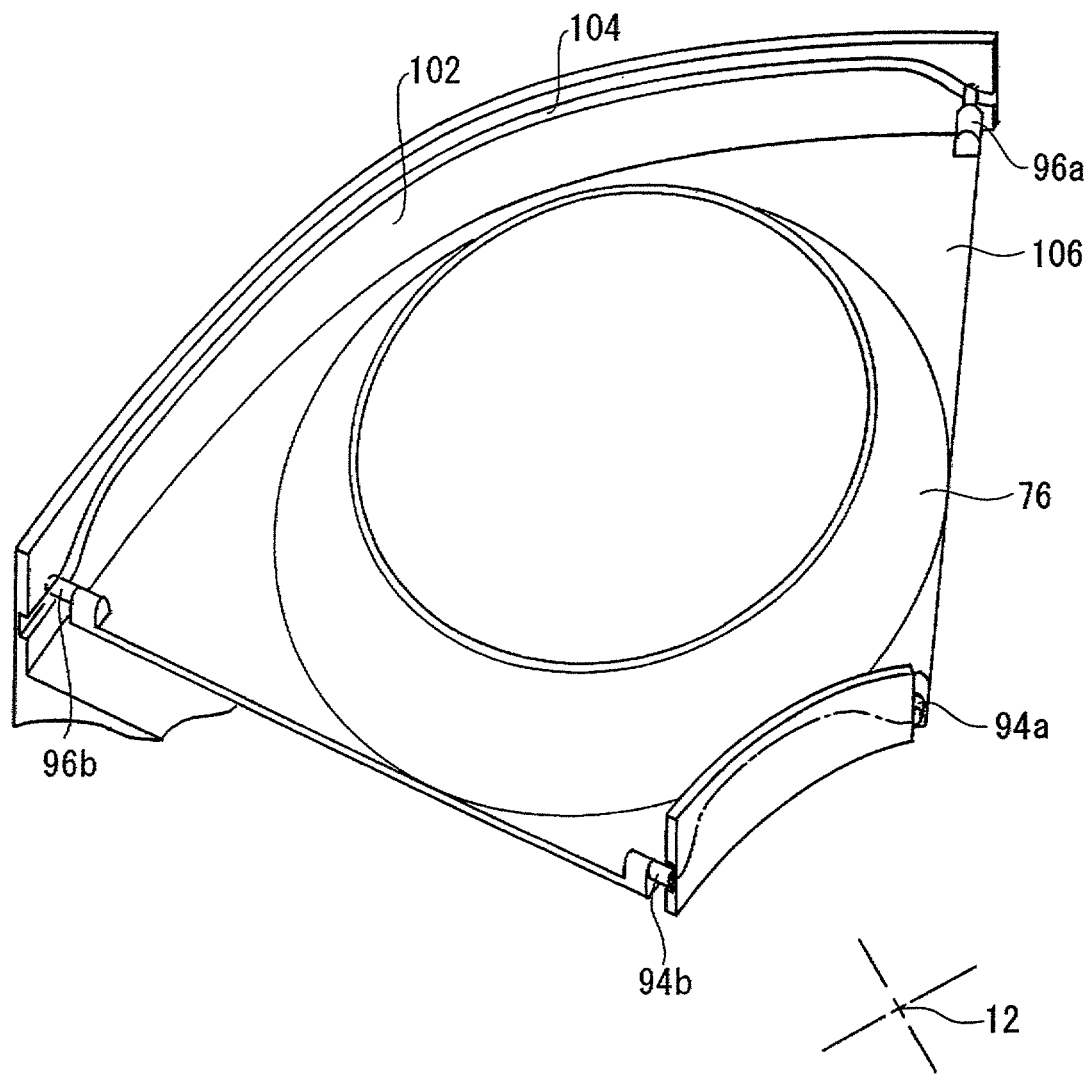
FIG. 18 is a partially cut away perspective view showing the vicinity of the hygroscopic material region 10*d* in FIG. 17.

Another preferred mode of the cam mechanism is shown in FIGS. 17 and 18. FIG. 18 shows the vicinity of the hygroscopic material region 10d shown in FIG. 17. In this mode, a flange 106 is formed on the outer periphery of the outer female sealing plate 76. The flange 106 has a fan-shaped outer periphery (lacking the portion inner than the inner cam wall 98) whose center is coincident with the rotating shaft 12. On the inner two apexes of the flange 106, pins 94a and 94b are mounted, respectively, and the tips of these pins slidably engage with the cam groove 100. On the outer two apexes of the flange 106, pins 96a and 96b are mounted, respectively, and the tips of these pins slidably engage with the cam groove 104. The rotating shaft 12, pin 94a and pin 96a are aligned on one straight line, and similarly, the shaft 12, pin 94b and pin 96b are aligned on one straight line. The end face of the outer female sealing plate 76 of the side of the hygroscopic material region is completely harbored in the inner side of the fan-shaped flange 106. In this mode too, the cam grooves 100 and 104 are formed such that each pin comes to the valley portion of each cam groove when air-tight connection is attained. The angle between the straight line connecting the rotating shaft 12, pin 94a and pin 96a and the straight line connecting the shaft 12, pin 96b and pin 96b is maximally 90 degrees (The value obtained by dividing the circle with the number of hygroscopic material regions. In the second embodiment, since the number of the hygroscopic material regions is 4, the maximum degree is the value obtained by dividing 360 degrees with 4). When this degree is the maximum, the shape of the valley is changed from the reversed trapezoid as shown in FIG. 17 to V-shape as shown in FIG. 15. In cases where the above-described degree is not the maximum, the bottom of the valley is flat as shown in FIG. 17. However, even in these cases, since the pins 96a and 94a must ascend the relatively steep slopes in order to get out of the valleys, they cannot get out of the valleys unless the weights of the hygroscopic material regions 10a and 10b are considerably increased by moisture absorption, as in the case where the valley is V-shaped. In the mode shown in FIGS. 17 and 18, since the outer female sealing plate 76 is supported by 4 pins through the flange 106 during the movement, the formation of the air-tight condition and the release thereof may be attained more stably and more strictly.

In the above-described second embodiment, the flexible members 78 and 80 may be in the form of bellows. The above-described O-rings 90 and 92 may be formed on the female sealing plates 74 and 76, respectively. Further, in cases where at least one of the sealing plates which are air-tightly connected is made of an elastic material, the O-ring is not necessary. The sealing of the hygroscopic material regions may also be attained by a mode other than the combination of the male and female sealing plates used in the above-described second embodiment. That is, for example, it may also be attained by a mode wherein the male sealing plates do not exist, and the female sealing plates are in the form of a suction cup (the center portion thereof is open) which tightly contacts the annular flat portions formed on the outer peripheries of each hygroscopic material region and of each hygroscopic material outer periphery passage 72. The pins 94 and 96 on the female sealing plate may be slided in the cam grooves 100 and 104 via bearings. Further, the cam grooves may not be in the form of a groove but may be in the form of irregularities (i.e., the shape shown in FIGS. 15 to 18 wherein the portions of the cam walls upper than the grooves are deleted). In this case, although it is necessary to continuously urge the female sealing plates to the side of the moisture-absorbing rotor in order to make the pins on the female sealing plates tightly contact the irregular surfaces, this may be accomplished by forming the flexible members 78 and 80 with an elastic material as mentioned above. If the urging is not sufficient, the urging may be reinforced by a spring or an elastic member not shown.

(2) Heater Utilizing Sunlight as Heat Source

In the second embodiment, two heaters (lower heater 58 and upper heater 83) utilizing the sunlight as the heat source are mounted. The structure and the principle of operation of the heaters are basically the same as the heater in the first embodiment, which were described referring to FIG. 7. The upper heat-supplying member 84 (FIG. 10) connected to the upper heater 83 has a spiral shape when viewed from the top. The movements of the heat medium in these heaters are indicated by short arrows in FIG. 10. The temperature of the heat medium may be raised to 50° C. to 120° C. by sunlight usually.

(3) Heating Means Utilizing Ambient Air as Heat Source

In the second embodiment, the heat radiator 66 which is a heating means utilizing the ambient air as its heat source is mounted. As described above, the heat radiator 66 is connected to the heat-absorbing panels 62 through the warm water bath 64. The heat-absorbing panels 62, warm water bath 64 and the heat radiator 66 are connected in the order mentioned from the lower side. Since the larger the surface area of the heat-absorbing panels 62 per a unit amount of heat medium, the larger the amount of heat absorbed from the ambient air (when the ambient temperature rises, the temperature of the heat medium located inside also rises almost simultaneously (ambient temperature=temperature of inside heat medium), the heat-absorbing panels 62 are preferably thin (preferably have a thickness of 1 to 5 cm). Each of the heat-absorbing panels 62 and the warm water bath 64 are connected such that the upper portion of the heat-absorbing panel 62 and the upper portion of the warm water bath 64 are connected through a connecting duct 63, and the lower portion of the heat-absorbing panel 62 and the lower portion of the warm water bath 64 are connected through a connecting duct 65 (FIGS. 10 and 12). The surfaces of the entire of the warm water bath 64 and of a part of the connecting ducts 63 and 65 up to a height above the warm water bath are heat-insulated (the portions indicated by double line in FIG. 10). The upper portion of the warm water bath 64 and the heat radiator 66 are connected through two connecting ducts 67a and 67b (FIG. 12), and the heat radiator 66 is slanted in the upper and lower direction. The connecting ducts 67a and 67b are heat-insulated.

In the morning, as the air temperature rises, the temperature of the heat medium in the heat-absorbing panels 62 also rises. When the temperature of the heat medium in the heat-absorbing panels 62 becomes higher than the temperature of the heat medium in the warm water bath 64, the heat medium moves from each of the heat-absorbing panels 62 to the warm water bath 64 through the connecting duct 63. The cold heat medium in the warm water bath 64 moves to the lower portion of the heat-absorbing panel 62 through the connecting duct 65. Air temperature generally falls slowly after reaching the highest temperature at shortly after noon. When this occurs, the temperature of the heat medium in the heat-absorbing panels 62 also falls, and the temperature thereof becomes lower than the temperature of the heat medium in the warm water bath 64. As a result, the density of the heat medium in the heat-absorbing panels 62 becomes larger than that of the heat medium in the warm water bath 64, so that the movement of the heat medium due to convection stops. In the second embodiment, by virtue of the fact that the heights of the heat-insulative layer of the two connecting ducts 67a and 67b are identical, the hotter and lighter heat medium dwells stably in a position higher than the heat-absorbing panels 62 when the temperature in the warm water bath 64 is higher than the temperature in the heat-absorbing panels 62. The movement of the heat medium may be thus controlled utilizing the difference in density alone, or may be controlled by providing a backflow valve. Similarly, when the ambient temperature of the heat radiator 66 is lower than the temperature of the heat medium therein, the heat medium is cooled (the air for regeneration is heated), and its density becomes large. As a result, the heat medium moves downwardly by descending the slope of the heat radiator 66, and then moves to the warm water bath 64 through the connecting duct 67b. When the ambient temperature of the heat radiator 66 is higher than the temperature of the heat medium therein, the heat medium is heated and becomes light. As a result, the heat medium dwells in the heat-radiating portion, and the movement thereof between the heat radiator 66 and the warm water bath 64 is stopped. Since the temperature of the heat medium is about identical to the ambient temperature, the temperature is maximally about 30 to 40° C. In FIG. 12, the second to fourth heat-absorbing panels 62 from the right are depicted such that the connecting ducts in the rear side are shown by partly cutting away the front surface of a part of the warm water bath 64, and the remaining heat-absorbing panels 62 and the warm water bath 64 are depicted such that the connecting ducts in the front side are cut away. It is allowable that sunlight may impinge on the heat-absorbing panels 62.

(4) Cooling Means Utilizing Ambient Air as Cooling Source

Figure 11:
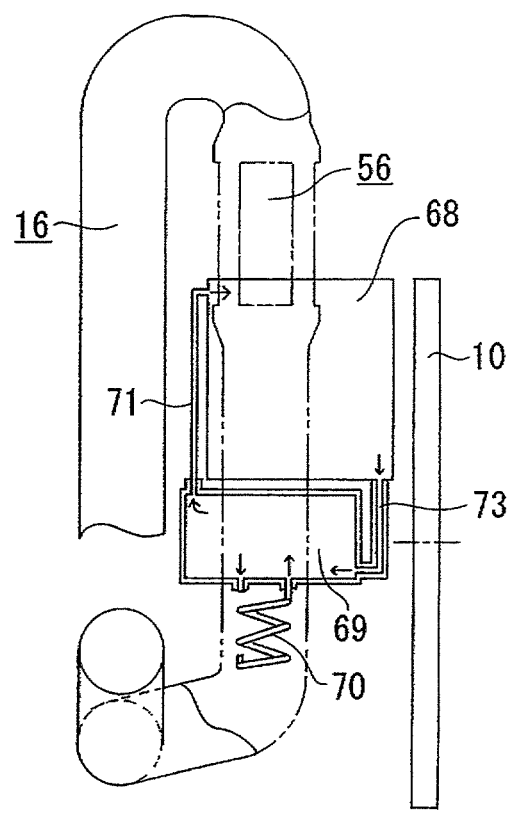
FIG. 11 shows a cooling means, when viewed from the left, arranged in the passage for regeneration in the second embodiment.
Figure 1:
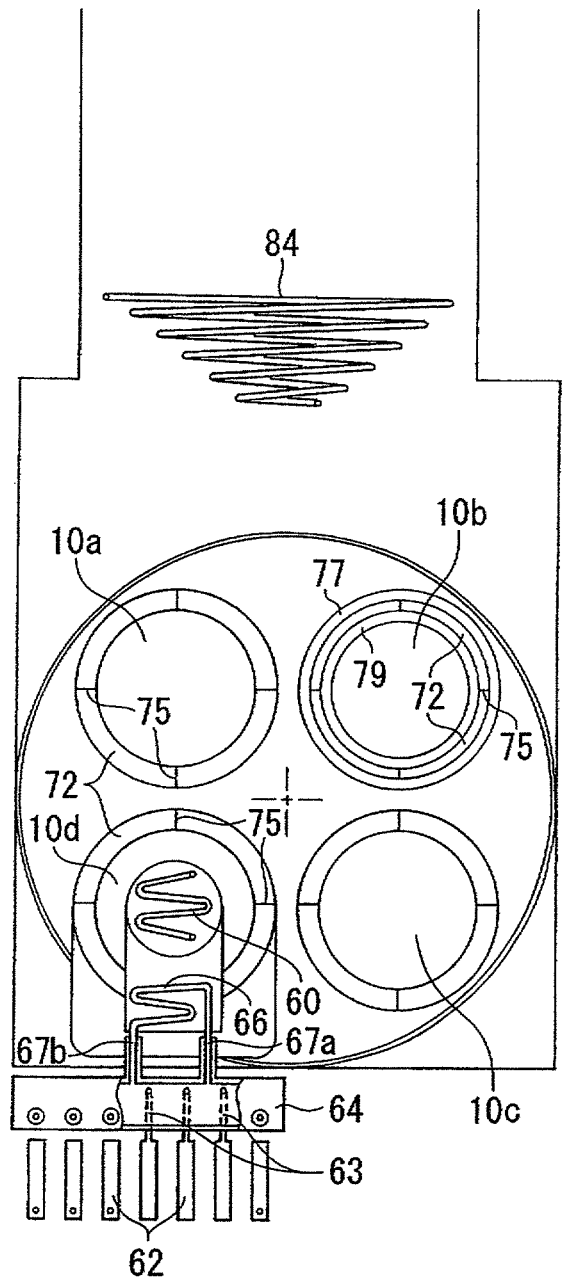
Figure 13:
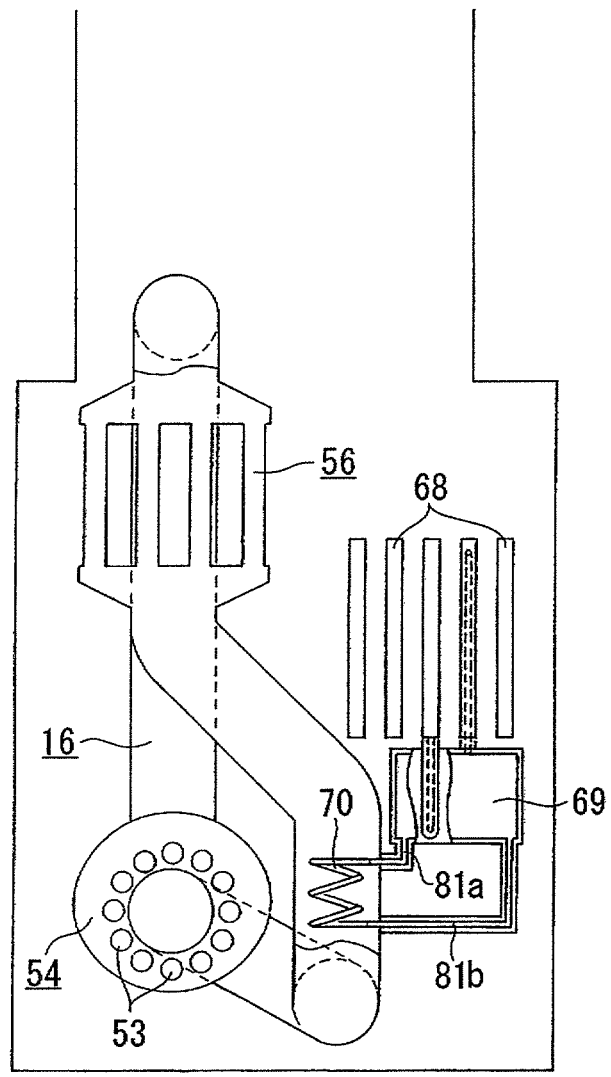
FIG. 13 is a front view of the cooling means in the second embodiment.

In the second embodiment, the heat-absorber 70 which is a cooling means utilizing the ambient air as the cooling source is mounted (FIGS. 9, 11 and 13). FIG. 11 shows the cooling means when viewed from the left side, and FIG. 13 shows the cooling means when viewed from the front side. The heat-radiating panels 68, the cold water bath 69 and the heat-absorber 70 are arranged in the order mentioned from the upper side. Since the larger the surface area of the heat-radiating panels 68 per a unit amount of heat medium, the larger the amount of heat radiated to the ambient air (when the ambient temperature falls, the temperature of the heat medium located inside also falls almost simultaneously (ambient temperature=temperature of inside heat medium), the heat-radiating panels 68 are preferably thin (preferably have a thickness of 1 to 5 cm). Each of the heat-radiating panels 68 and the cold water bath 69 are connected such that the lower portion of the heat-radiating panel 68 and the upper portion of the cold water bath 69 are connected through a connecting duct 71, and the lower portion of the heat-radiating panel 68 and the lower portion of the cold water bath 69 are connected through a connecting duct 73 (FIG. 11). The outer surfaces of the entire cold water bath 69 and of the connecting ducts 71 and 73 up to the height of the lower surface of the heat-radiating panel 68 are heat-insulated. The lower portion of the cold water bath 69 and the heat-absorber 70 are connected through two connecting ducts 81a and 81b (FIG. 13), and the heat-absorber 70 is spiral and slanted in the upper and lower direction. The connection ducts 81a and 81b are heat-insulated.

In the night, as the ambient temperature falls, the temperature of the heat medium in the heat-radiating panels 68 falls. When the temperature of the heat medium in the heat-radiating panels 68 becomes lower than the temperature of the heat medium in the cold water bath 69, the heat medium moves from the lower portion of the heat-radiating panel 68 to the cold water bath 69 through the connecting duct 73 (the flow of the heat medium is indicated by arrows in FIG. 11). The hot heat medium in the cold water bath 69 moves to the upper portion of the heat-radiating panel 68 through the connecting duct 71. Air temperature generally rises slowly after reaching the lowest temperature before dawn. When this occurs, the temperature of the heat medium in the heat-radiating panels 68 also rises and becomes higher than the temperature of the heat medium in the cold water bath 69. As a result, the density of the heat medium in the heat-radiating panels 68 becomes smaller than the temperature of the heat medium in the cold water bath 69, so that the movement of the heat medium due to convection is stopped. In the second embodiment, by virtue of the fact that the heights of the heat-insulative layer of the two connecting ducts 71 and 73 are identical, the colder and heavier heat medium dwells stably in a position lower than the heat-radiating panels 68 when the temperature in the cold water bath 69 is lower than the temperature in the heat-radiating panels 68. The movement of the heat medium may be thus controlled utilizing the difference in density alone, or may be controlled by providing a backflow valve. Similarly, when the ambient temperature of the heat-absorber 70 is higher than the temperature of the heat medium therein, the heat medium is heated (the air for regeneration is cooled), and its density becomes small. As a result, the heat medium moves upwardly by ascending the slope of the heat-absorber 70, and then moves to the cold water bath 69 through the connecting duct 81a. When the ambient temperature of the heat-absorber 70 is lower than the temperature of the heat medium therein, the heat medium is cooled and becomes heavy. As a result, the heat medium dwells in the heat-absorber 70 and in connecting ducts 81a and 81b, and the movement thereof between the heat-absorber 70 and the cold water bath 69 is stopped. Since the temperature of the heat medium is about identical to the ambient temperature, the temperature is minimally about 0 to 10° C. The heat-radiating panels 68 are arranged in shade.

The heat-absorbing panels and the heat-radiating panels may be united to form heat-radiating/absorbing panels. In this case, the heat radiator, warm water bath, heat-radiating/absorbing panels, cold water bath and heat absorber are arranged in the order mentioned from the upper side. Further, for cooling the air for regeneration, radiative cooling may be utilized. In this case, panels for radiative cooling (sky radiator), cold water bath, connecting ducts, heat-absorbing member, heat-insulative material and so on are necessary. The arrangements of each member is the same as the cooling means utilizing the ambient air as the heat source except that the heat-radiating panels are replaced with panels for radiative cooling (The radiative cooling surfaces of the panels for radiative cooling preferably face substantially upside (e.g., in the northern hemisphere, facing the northern sky at an angle of 10 degrees from the horizon).

(5) Heat Exchanger for Heat Recovery

As described above, the second embodiment comprises the heat exchanger for heat recovery 54 in the passage for regeneration 16. As shown in FIGS. 8 and 9, the heat exchanger for heat recovery 54 comprises an end plate 55 at the end of the side of the moisture-absorbing rotor, and a plurality of first passages 53 are arranged along the periphery of the end plate 55. The first passages 53 are arranged in parallel with the direction of the passage for regeneration.

The air for regeneration after passing through the hygroscopic material region 10d passes through the first passages 53. On the other hand, the air for regeneration after condensation of moisture passes through the second passage (the space between the first passages 53) of the heat exchanger for heat recovery 54. Since the end plate 55 does not allow passage of air, the air for regeneration is inevitably driven to the peripheral portion of the passage for regeneration (indicated by arrows in FIG. 9), and enters the outer duct of the concentric double ducts in the heating section 16c in the passage for regeneration 16 after passing through the hygroscopic material outer periphery passage 72 (arrows in FIG. 9).

Figure 19:
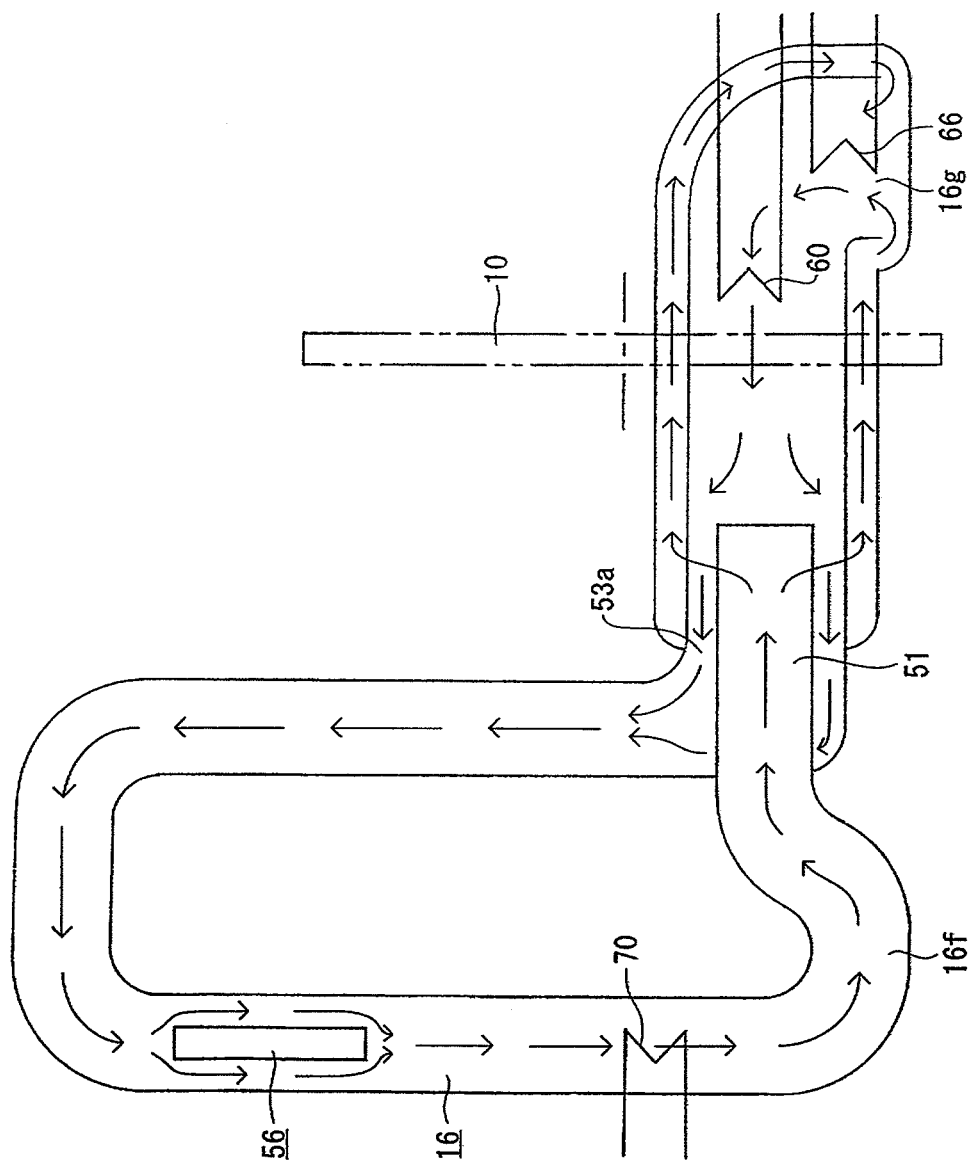
FIG. 19 schematically shows the passage for regeneration in the second embodiment.

(6) Principle by which Air for Regeneration Circulates in Passage for Regeneration FIG. 19 schematically shows the passage for regeneration 16 in the second embodiment. The passage including the heat exchanger for cooling 56 and the heat-absorber 70 is developed to the rear side of the main body, and the moisture-absorbing rotor 10 is indicated by the two-dot chain. The cylindrical curved passage enclosing the heat radiator 66 and lower heat-supplying member 60 (the inner duct of the concentric double duct) is called "inner curved passage"; the passage from the exit 53a of the heat exchanger for heat recovery 54 (the exit of the first passages 53 of the side apart from moisture-absorbing rotor 10) to the entrance of the heat exchanger for cooling 56 after ascending, curving in U-shape and shortly descending, is called "ascending passage"; the passage from the entrance of the heat exchanger for cooling 56 to the entrance 51 of the heat exchanger for heat recovery 54 (the entrance of the second passage at the end opposite to the end plate 55), after descending from the entrance of the heat exchanger for cooling 56, reaching the site 16f lowest in the passage for regeneration, and ascending by the distance about the diameter of the passage is called "descending passage"; the passage from the entrance 51 of the heat exchanger for heat recovery 54 to the entrance 16g of the inner curved passage (the lower end of the inner curved passage" after extending horizontally to the front side is called "heat recovery passage", respectively, for convenience. The passage from the inner curved passage to the exit 53a of the heat exchanger for heat recovery is horizontal, and the lowest site is the lower end 16g of the inner curved passage. Although the air in this passage is the hottest in the air for regeneration, since the lowest site is the lower end 16g of the inner curved passage, the air can move only to the side of the ascending passage. Although the heat recovery passage is almost horizontal, and the air therein is hotter than the air in the descending passage because heat is recovered from the air at the exit of the moisture-absorbing rotor and from the inner curved passage, the air can move only to the side of the inner curved passage because the descending passage side is curved downwardly in a distance of not less than the diameter of the passage (the lower end 16f of the passage for regeneration). The volume between the lower end 16g of the inner curved passage and the exit 53a of the heat exchanger for heat recovery and the volume of the heat recovery passage are designed to be substantially identical (in order to make the flow rate constant), and the sir temperature of the former is higher (the ascending force of the former is stronger), so that in the horizontal portion of the passage for regeneration including both the former and the latter, the air for regeneration flows in the direction in which at least the former air flows, that is, in the direction to the ascending passage. In the ascending passage and the descending passage, as described in the first embodiment, the air for regeneration flows from the ascending passage to the descending passage. Thus, the air for regeneration flows in the inner curved passage, the first passages of the heat exchanger for heat recovery, ascending passage, descending passage and heat recovery passage, in the order mentioned, and circulates in this cycle.

The outer surface of the passage for regeneration from the rear side of the moisture-absorbing rotor 10 to the heat exchanger for cooling 56 is preferably heat-insulated. Since by the heat from the lower heat-supplying member 60 and from the heat radiator 66, which heat did not pass through the hygroscopic material, that is, by the heat which went out through the concentric double duct to the outside of the passage for regeneration, the air is warmed and flows upwardly, the amount of heat of the upper heat-supplying member 84 may be decreased. Further, the ambient air of the apparatus flows upwardly because it is heated by passing through the heat exchanger for cooling 56. Thus, the heat exchanger for cooling 56 serves as a preheater before the air is heated by the upper heat-supplying member 84.

The invention claimed is:

1. An apparatus for carrying out a method for extracting water from air, comprising: a rotatably mounted hygroscopic moisture-absorbing rotor having one region through which air can pass in the direction of thickness of said moisture-absorbing rotor; a passage for regeneration through which air for regeneration is circulated by heating with sunlight and which has openings at the opposing two surfaces of a regeneration region of said moisture-absorbing rotor, said regeneration region hung a part of said moisture-absorbing rotor, at which said moisture-absorbing rotor that absorbed moisture is regenerated; and a drain hole for taking out condensed water from said passage for regeneration, which is formed at a lower portion of said passage for regeneration, wherein said apparatus is useful in a method for extracting water from air comprising the steps of:
directly and/or indirectly heating, with sunlight, said air for regeneration to be supplied to said regeneration region of said moisture-absorbing rotor so that said air for regeneration is circulated through said passage for regeneration and regeneration of said moisture-absorbing rotor occurs;
cooling the air for regeneration after regenerating said moisture-absorbing rotor to condense moisture; and
collecting the generated condensed water from said drain hole;

said moisture-absorbing rotor being rotated so that said part of said moisture-absorbing rotor, which serves as said regeneration region, is changed.

2. The apparatus according to claim 1, further comprising a heater for heating said air for regeneration, wherein said heater comprises:
a heat accumulator section having a light-receiving surface which receives sunlight;
a heat medium which accumulates and transmits heat from sunlight; and
a heat-supplying section which supplies the heat of said heat medium to said air for regeneration;
wherein said heat medium being heated by sunlight at said heat accumulator section, being cooled at said heat-supplying section by supplying heat to said air for regeneration, and circulating through said heat accumulator section and said heat-supplying section;
said air for regeneration heated by said heater passing through said regeneration region to regenerate said regeneration region.

3. The apparatus according to claim 2, wherein said heat accumulator section and said heat-supplying section are connected through two ducts, said heat medium circulating through a circuit constituted by said two ducts, said heat accumulator section and said heat-supplying section.

4. The apparatus according to claim 2, wherein a rotating shaft mounting said moisture-absorbing rotor is arranged in a direction other than vertical direction, said moisture-absorbing rotor being rotated due to the difference in weight between said regeneration region and the region other than said regeneration region.

5. The apparatus according to claim 2, further comprising: a passage for supplying air for moisture absorption, whose one end opens at an air for moisture absorption-supplying surface of a moisture absorption region which is a part or the entire of the region other than said regeneration region in said moisture-absorbing rotor; and a passage for discharging air for moisture absorption, whose one end opens at an air for moisture absorption-discharging surface from which the dehumidified air after passing through said moisture absorption region is discharged.

6. The apparatus according to claim 5, further comprising a heater for heating said air for moisture absorption, said heater for heating said air for moisture absorption comprising: a heat accumulator section having a light-receiving surface which receives sunlight; a heat medium which accumulates and transmits heat from sunlight; and a heat-supplying section which supplies the heat of said heat medium to said air for regeneration; said heat medium being heated by sunlight at said heat accumulator section, being cooled at said heat-supplying section by supplying heat to said air for regeneration, and circulating through said heat accumulator section and said heat-supplying section.

7. The apparatus according to claim 6, wherein said heat accumulator section and said heat-supplying section are connected through two ducts, said heat medium circulating through a circuit constituted by said two ducts, said heat accumulator section and said heat-supplying section.

8. The apparatus according to claim 2, further comprising a heat exchanger which exchanges heat between said air for regeneration and said air for moisture absorption or ambient air other than said air for moisture absorption.

9. The apparatus according to claim 2, further comprising means for collecting said condensed water through said drain hole without allowing air flow.

10. The apparatus according claim 1, wherein the entire of said moisture-absorbing rotor is formed of a hygroscopic material through which air can pass through in the direction of thickness thereof.

11. The apparatus according to claim 1, wherein said moisture-absorbing rotor comprises a plurality of hygroscopic material regions through which air can pass through.

12. The apparatus according to claim 11, wherein said plural of hygroscopic material regions have the same shape and size and are arranged equidistantly on a circumference of a circle whose center is coincident with said rotating shaft mounting said moisture-absorbing rotor, both surfaces of one of said plurality of hygroscopic material regions being connected air-tightly to said passage for regeneration.

13. The apparatus according to claim 12, wherein a sealer is connected to each end of said passage for regeneration through a flexible member, the end of said passage for regeneration can be connected air-tightly to each surface of said hygroscopic material regions, said sealer being movable in the direction perpendicular to the surface of said hygroscopic material region by virtue of a cam mechanism using a rotating force of said moisture-absorbing rotor.

14. The apparatus according to claim 13, further comprising: a cylindrical inner cam wall whose center is coincident with said rotating shaft mounting said moisture-absorbing rotor, said inner cam wall being formed on said moisture-absorbing rotor; and an outer cam wall whose center is coincident with said rotating shaft mounting said moisture-absorbing rotor, said outer cam wall being formed on outer periphery of said moisture-absorbing rotor or the vicinity thereof; two pins formed on said sealing means sliding along cam grooves formed in said inner cam wall and in said outer cam wall, respectively.

15. The apparatus according to claim 13, further comprising: a cylindrical inner cam wall whose center is coincident with said rotating shaft of said moisture-absorbing rotor, said inner cam wall being formed on said moisture-absorbing rotor; and an outer cam wall whose center is coincident with said rotating shaft of said moisture-absorbing rotor, said outer cam wall being formed on outer periphery of said moisture-absorbing rotor or the vicinity thereof; said sealing means being provided with a flange, two pins among four pins formed on said flange sliding along a cam groove formed in said inner cam wall, and other two pins among said four pins sliding along a cam groove formed in said outer cam wall.

16. The apparatus according to claim 1, further comprising a heat exchanger for heat recovery, which exchanges heat between said air for regeneration immediately after passing through said moisture-absorbing rotor and said air for regeneration after condensation.

17. The apparatus according to claim 1, further comprising, in said passage for regeneration, a heater utilizing ambient air as a heat source, the air for regeneration heated by this heater passing through said regeneration region to regenerate said regeneration region.

18. The apparatus according to claim 17, wherein said heater comprises: a heat-absorbing panel; a warm water bath located at a position upper than said heat-absorbing panel, which communicates with said heat-absorbing panel; and a heat radiator located at a position upper than said warm water bath, which communicates with said warm water bath; a heat medium being capable of circulating through said heat-absorbing panel, said warm water bath and said heat radiator.

19. The apparatus according to claim 1, further comprising, in said passage for regeneration, a cooling means utilizing ambient air as a cooling source, wherein said air for regeneration is cooled with this cooler so that condensation of moisture is accelerated.

20. The apparatus according to claim 19, wherein said cooling means comprises: a heat-radiating panel; a cold water bath located at a position lower than said heat-radiating panel, which communicates with said heat-radiating panel; and a heat-absorber located at a position lower than said cold water bath, which communicates with said cold water bath.

* * * * *